United States Patent
Mizumoto

(10) Patent No.: US 10,708,405 B2
(45) Date of Patent: Jul. 7, 2020

(54) ELECTRONIC APPARATUS, CONTROL DEVICE, AND RECORDING MEDIUM

(71) Applicant: KYOCERA CORPORATION, Kyoto (JP)

(72) Inventor: Akira Mizumoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/683,681

(22) Filed: Aug. 22, 2017

(65) Prior Publication Data

US 2018/0063309 A1 Mar. 1, 2018

(30) Foreign Application Priority Data

Aug. 29, 2016 (JP) .................................. 2016-166604

(51) Int. Cl.
*H04M 1/67* (2006.01)
*G06K 9/00* (2006.01)
(Continued)

(52) U.S. Cl.
CPC .............. *H04M 1/67* (2013.01); *G06F 21/32* (2013.01); *G06K 9/001* (2013.01); *G06K 9/0002* (2013.01);
(Continued)

(58) Field of Classification Search
CPC .. H04L 63/0861; G06K 9/0002; G06K 9/001; H04M 1/72583; H04M 2250/12;
(Continued)

(56) References Cited

U.S. PATENT DOCUMENTS 7,738,916 B2 * 6/2010 Fukuda ............... G06F 3/03547
345/173
2014/0173443 A1 6/2014 Hawkins, III et al.
(Continued)

FOREIGN PATENT DOCUMENTS

| JP | WO2004104813 A1 | 12/2004 |
| JP | 2006-303905 A | 11/2006 |
| JP | 2007-241487 A | 9/2007 |

OTHER PUBLICATIONS

Preparation/Basic Knowledge, 821N GLA Instruction Manual, Softbank Corporation Internet <URL:http://www.softbank.jp/mobile/support/product/821n gla/download/> NEC Internet <URL:http://www.softbank.jp/mobile/support/product/821n gla/download/> Jul. 31, 2008, pp. 1-2 to 1-5 (reference indicating well-known technology); English Translation of related parts (1-2 to 1-5) is provided.

*Primary Examiner* — Khawar Iqbal
(74) *Attorney, Agent, or Firm* — Duane Morris LLP

(57) ABSTRACT

The electronic apparatus includes a display, a hardware button, a fingerprint sensor, and at least one processor. The fingerprint sensor detects a fingerprint of a finger touching the hardware button. The processor performs fingerprint authentication based on a fingerprint detection result obtained by the fingerprint sensor, and causes, when determining that a predetermined operation has been performed with the finger on the hardware button, the display to display information in accordance with the predetermined operation. The processor has a first state of performing, when the predetermined operation is performed, the fingerprint authentication, and causing, if the fingerprint authentication fails, the display to start displaying notification information indicating that the fingerprint authentication has failed, and then causing the display to start displaying the information in accordance with the predetermined operation.

3 Claims, 17 Drawing Sheets

(51) Int. Cl.
*G06F 21/32* (2013.01)
*H04L 29/06* (2006.01)
*H04W 12/06* (2009.01)
*H04M 1/725* (2006.01)
*G06F 3/044* (2006.01)

(52) U.S. Cl.
CPC ......... *H04L 63/0861* (2013.01); *H04W 12/06* (2013.01); *G06F 3/044* (2013.01); *H04M 1/7258* (2013.01); *H04M 1/72583* (2013.01); *H04M 2250/12* (2013.01)

(58) Field of Classification Search
CPC ......... H04M 1/00; H04M 1/67; H04W 12/06; G06F 3/044; G06F 21/32; G06F 3/0489
See application file for complete search history.

(56) References Cited

U.S. PATENT DOCUMENTS

| | | | |
|---|---|---|---|
| 2015/0077364 A1* | 3/2015 | Parthasarathy | G06F 3/016 345/173 |
| 2015/0324570 A1* | 11/2015 | Lee | G06K 9/3208 382/124 |
| 2015/0324627 A1* | 11/2015 | Cho | G06K 9/00087 726/19 |
| 2016/0042166 A1* | 2/2016 | Kang | G06F 21/32 726/7 |
| 2016/0299556 A1* | 10/2016 | Jueng | G06F 3/0487 |
| 2016/0307025 A1* | 10/2016 | Lee | G06K 9/00006 |
| 2017/0017783 A1* | 1/2017 | Willis | G06F 21/32 |
| 2017/0046556 A1* | 2/2017 | Kim | G06F 3/04883 |
| 2017/0372122 A1* | 12/2017 | Shim | G06F 3/0414 |
| 2018/0082282 A1* | 3/2018 | Van Os | G06Q 20/3674 |
| 2018/0173930 A1* | 6/2018 | Han | H04L 63/0861 |
| 2018/0211030 A1* | 7/2018 | Kim | G06F 21/45 |
| 2018/0260803 A1* | 9/2018 | Seol | G06F 21/32 |
| 2019/0080071 A1* | 3/2019 | Van Os | G06F 3/044 |

* cited by examiner

F I G . 7
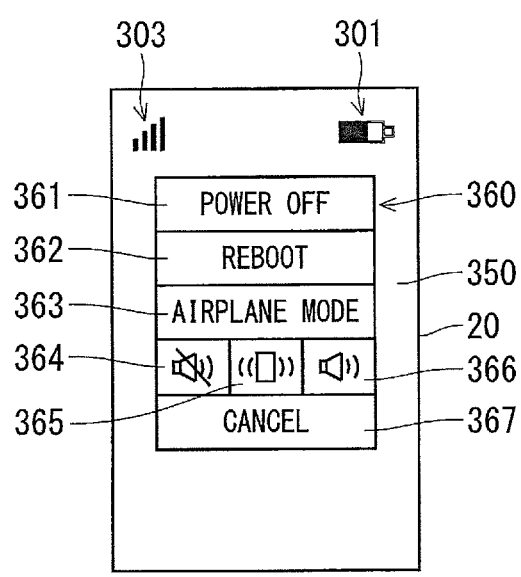

F I G . 1 1
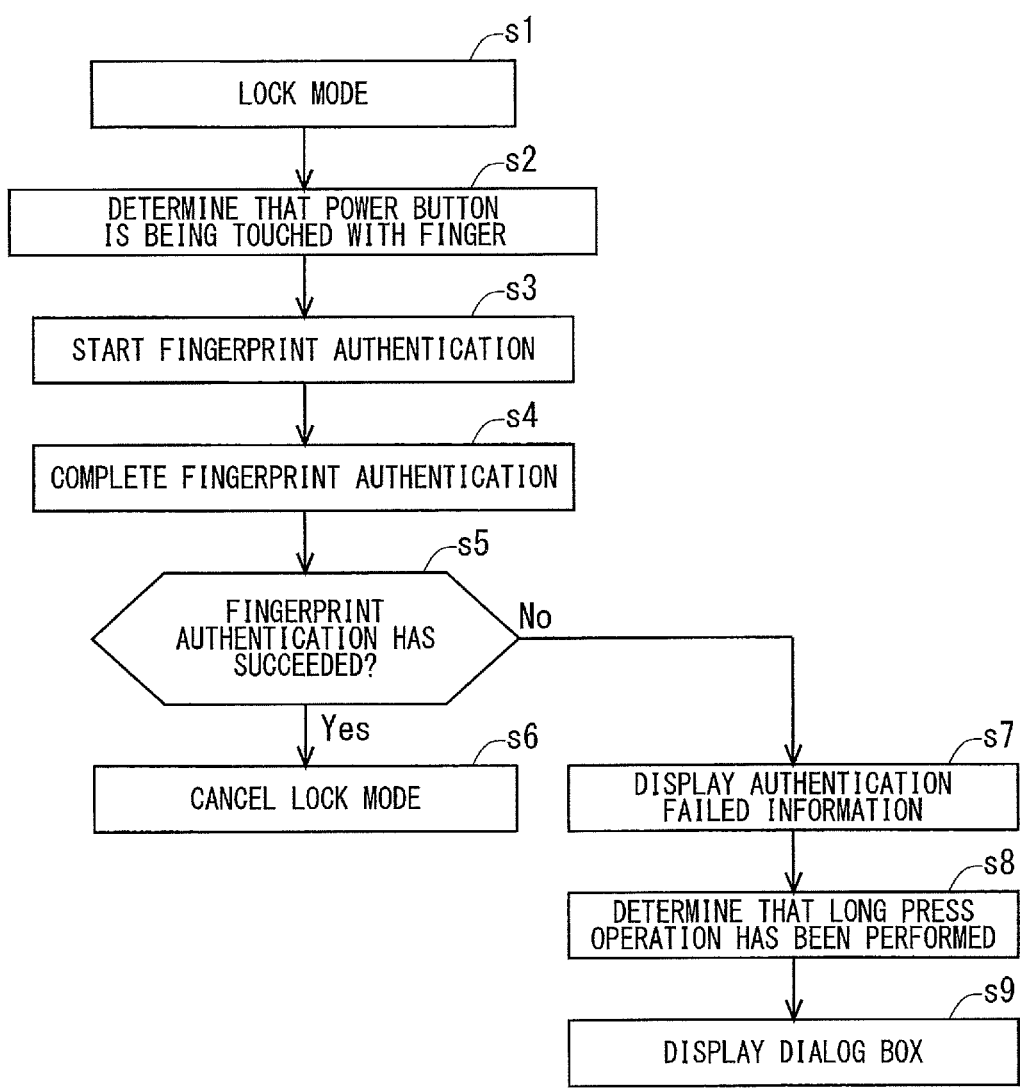

FIG. 16
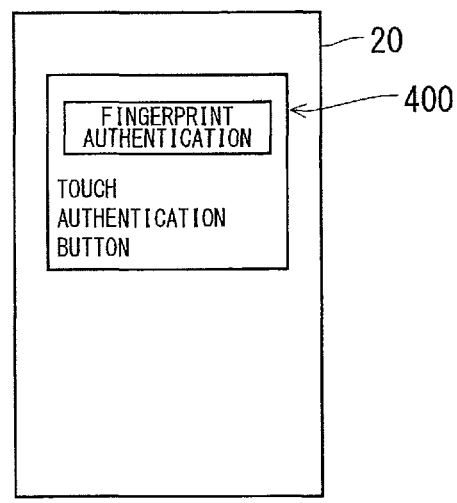
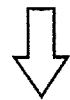
AUTHENTICATION BUTTON IS TOUCHED
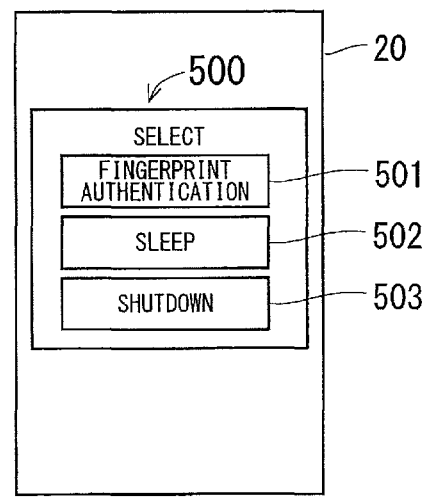
(FINGERPRINT AUTHENTICATION IS NOT PERFORMED)

F I G. 1 9
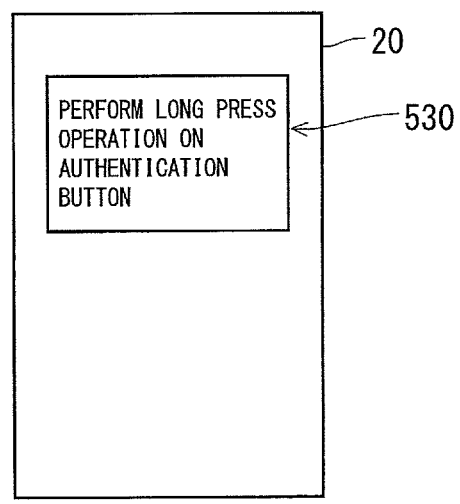

FIG. 20
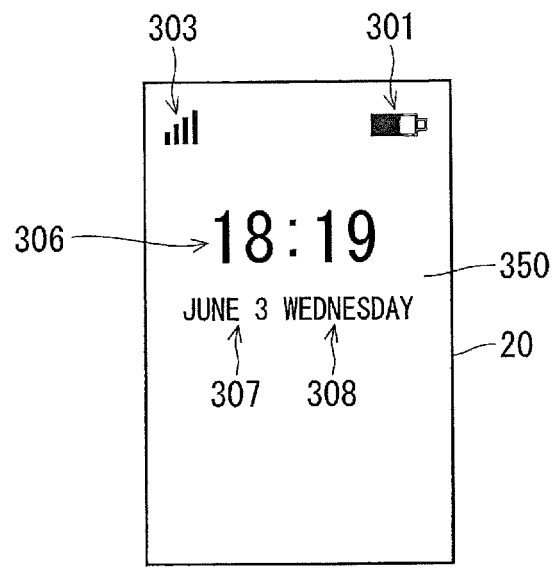
(AUTHENTICATION BUTTON IS BEING TOUCHED)
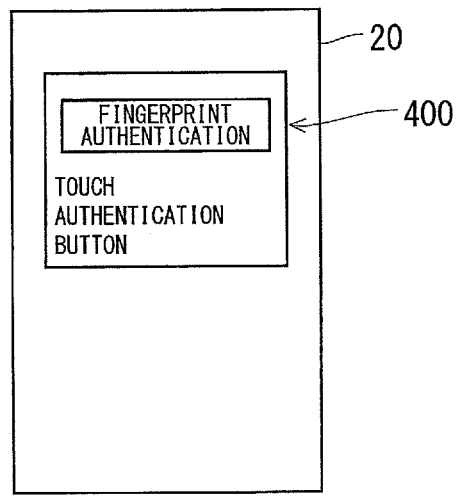
(FINGERPRINT AUTHENTICATION IS NOT PERFORMED)

ELECTRONIC APPARATUS, CONTROL DEVICE, AND RECORDING MEDIUM

CROSS-REFERENCE TO RELATED APPLICATION

The present application claims priority under 35 U.S.C. § 119 to Japanese Patent Application No. 2016-166604, filed on Aug. 29, 2016, entitled "ELECTRONIC APPARATUS, CONTROL DEVICE, CONTROL PROGRAM, AND METHOD OF OPERATING ELECTRONIC APPARATUS". The content of which is incorporated by reference herein in its entirety.

FIELD

Embodiments of the present disclosure relate generally to electronic apparatuses.

BACKGROUND

Various techniques concerning electronic apparatuses have been proposed.

SUMMARY

An electronic apparatus, a control device, a non-transitory computer readable recording medium, and a method of operating an electronic apparatus are disclosed. In one embodiment, an electronic apparatus includes a display, a hardware button, a fingerprint sensor, and at least one processor. The fingerprint sensor is configured to detect a fingerprint of a finger touching the hardware button. The at least one processor is configured to perform fingerprint authentication based on a fingerprint detection result obtained by the fingerprint sensor, and to cause, when determining that a predetermined operation has been performed with the finger on the hardware button, the display to display information in accordance with the predetermined operation. The at least one processor has a first state of performing, when the predetermined operation is performed, the fingerprint authentication, and causing, if the fingerprint authentication fails, the display to start displaying notification information indicating that the fingerprint authentication has failed, and then causing the display to start displaying the information in accordance with the predetermined operation.

In one embodiment, an electronic apparatus includes a display, a hardware button, a fingerprint sensor, and at least one processor. The fingerprint sensor is configured to detect a fingerprint of a finger touching the hardware button. The at least one processor is configured to perform fingerprint authentication based on a fingerprint detection result obtained by the fingerprint sensor. The at least one processor has a first state and a second state. The first state is a state of performing, when determining that a first operation has been performed with the finger on the hardware button, first processing in accordance with the first operation without performing the fingerprint authentication. The second state is a state of causing the display to display a confirmation screen for confirming user's intent as to whether to perform the fingerprint authentication or to perform the first processing. When the hardware button is touched with the finger, the at least one processor being in the second state causes the display to display the confirmation screen without performing the fingerprint authentication, and then performs the fingerprint authentication when the electronic apparatus has received an instruction to perform the fingerprint authentication, and performs the first processing when the electronic apparatus has received an instruction to perform the first processing.

In one embodiment, an electronic apparatus includes a hardware button, a fingerprint sensor, and at least one processor. The fingerprint sensor is configured to detect a fingerprint of a finger touching the hardware button. The at least one processor is configured to perform fingerprint authentication based on a fingerprint detection result obtained by the fingerprint sensor. The at least one processor has an authentication performance state of performing the fingerprint authentication when the hardware button is touched with the finger. The at least one processor does not perform the fingerprint authentication if the hardware button is being touched with the finger when the at least one processor has changed to the authentication performance state.

In one embodiment, a control device is included in an electronic apparatus to control operation of the electronic apparatus. The electronic apparatus includes a display, a hardware button, and a fingerprint sensor configured to detect a fingerprint of a finger touching the hardware button. The control device includes at least one processor configured to perform fingerprint authentication based on a fingerprint detection result obtained by the fingerprint sensor, and to cause, when determining that a predetermined operation has been performed with the finger on the hardware button, the display to display information in accordance with the predetermined operation. The at least one processor has a state of performing, when the predetermined operation is performed, the fingerprint authentication, and causing, if the fingerprint authentication fails, the display to start displaying notification information indicating that the fingerprint authentication has failed, and then causing the display to start displaying the information in accordance with the predetermined operation.

In one embodiment, a control device is included in an electronic apparatus to control operation of the electronic apparatus. The electronic apparatus includes a display, a hardware button, and a fingerprint sensor configured to detect a fingerprint of a finger touching the hardware button. The control device includes at least one processor configured to perform fingerprint authentication based on a fingerprint detection result obtained by the fingerprint sensor. The at least one processor has a first state and a second state. The first state is a state of performing, when determining that a predetermined operation has been performed with the finger on the hardware button, predetermined processing in accordance with the predetermined operation without performing the fingerprint authentication. The second state is a state of causing the display to display a confirmation screen for confirming user's intent as to whether to perform the fingerprint authentication or to perform the predetermined processing. When the hardware button is touched with the finger, the at least one processor being in the second state causes the display to display the confirmation screen without performing the fingerprint authentication, and then performs the fingerprint authentication when the electronic apparatus has received an instruction to perform the fingerprint authentication, and performs the predetermined processing when the electronic apparatus has received an instruction to perform the predetermined processing.

In one embodiment, a control device is included in an electronic apparatus to control operation of the electronic apparatus. The electronic apparatus includes a hardware button and a fingerprint sensor configured to detect a fingerprint of a finger touching the hardware button. The control device includes at least one processor configured to perform fingerprint authentication based on a fingerprint detection result obtained by the fingerprint sensor. The at least one processor has an authentication performance state of performing the fingerprint authentication when the hardware button is touched with the finger. The at least one processor does not perform the fingerprint authentication if the hardware button is being touched with the finger when the at least one processor has changed to the authentication performance state.

In one embodiment, a non-transitory computer readable recording medium stores a control program for controlling an electronic apparatus including a hardware button and a fingerprint sensor configured to detect a fingerprint of a finger touching the hardware button. The control program causes the electronic apparatus to perform, when a predetermined operation is performed with the finger on the hardware button, fingerprint authentication based on a fingerprint detection result obtained by the fingerprint sensor, and start displaying notification information indicating that the fingerprint authentication has failed if the fingerprint authentication fails, and then start displaying information in accordance with the predetermined operation.

In one embodiment, a non-transitory computer readable recording medium stores a control program for controlling an electronic apparatus including a hardware button and a fingerprint sensor configured to detect a fingerprint of a finger touching the hardware button. The control program causes the electronic apparatus to perform, when it is determined that a predetermined operation has been performed with the finger on the hardware button, predetermined processing in accordance with the predetermined operation without performing fingerprint authentication based on a fingerprint detection result obtained by the fingerprint sensor. The control program causes the electronic apparatus to display a confirmation screen for confirming user's intent as to whether to perform the fingerprint authentication or to perform the predetermined processing. The control program causes the electronic apparatus to display, when the hardware button is touched with the finger, the confirmation screen without performing the fingerprint authentication, and then perform the fingerprint authentication when the electronic apparatus has received an instruction to perform the fingerprint authentication, and perform the predetermined processing when the electronic apparatus has received an instruction to perform the predetermined processing.

In one embodiment, a non-transitory computer readable recording medium stores a control program for controlling an electronic apparatus including a hardware button and a fingerprint sensor configured to detect a fingerprint of a finger touching the hardware button. The control program causes the electronic apparatus not to perform fingerprint authentication if the hardware button is being touched with the finger when the electronic apparatus has changed to an authentication performance state of performing the fingerprint authentication based on a fingerprint detection result obtained by the fingerprint sensor when the hardware button is touched with the finger.

In one embodiment, disclosed is a method of operating an electronic apparatus including a hardware button and a fingerprint sensor configured to detect a fingerprint of a finger touching the hardware button. The method includes performing, when a predetermined operation is performed with the finger on the hardware button, fingerprint authentication based on a fingerprint detection result obtained by the fingerprint sensor, and starting, if the fingerprint authentication fails, displaying notification information indicating that the fingerprint authentication has failed, and then starting displaying information in accordance with the predetermined operation.

In one embodiment, disclosed is a method of operating an electronic apparatus including a hardware button and a fingerprint sensor configured to detect a fingerprint of a finger touching the hardware button. The method includes: performing, when it is determined that a predetermined operation has been performed with the finger on the hardware button, predetermined processing in accordance with the predetermined operation without performing fingerprint authentication based on a fingerprint detection result obtained by the fingerprint sensor; displaying a confirmation screen for confirming user's intent as to whether to perform the fingerprint authentication or to perform the predetermined processing; and displaying, when the hardware button is touched with the finger, the confirmation screen without performing the fingerprint authentication, and then performing the fingerprint authentication when the electronic apparatus has received an instruction to perform the fingerprint authentication, and performing the predetermined processing when the electronic apparatus has received an instruction to perform the predetermined processing.

In one embodiment, disclosed is a method of operating an electronic apparatus including a hardware button and a fingerprint sensor configured to detect a fingerprint of a finger touching the hardware button. Fingerprint authentication is not performed if the hardware button is being touched with the finger when the electronic apparatus has changed to an authentication performance state of performing the fingerprint authentication based on a fingerprint detection result obtained by the fingerprint sensor when the hardware button is touched with the finger.

BRIEF DESCRIPTION OF THE DRAWINGS

FIG. 7 illustrates an example of the display of the electronic apparatus;

FIG. 11 illustrates a flowchart showing an example of the operation of the electronic apparatus;

FIG. 16 illustrates a diagram for explaining an example of the operation of the electronic apparatus;

FIG. 19 illustrates an example of the display of the electronic apparatus;

FIG. 20 illustrates a diagram for explaining an example of the operation of the electronic apparatus.

DETAILED DESCRIPTION

<Appearance of Electronic Apparatus>

Figure 1:
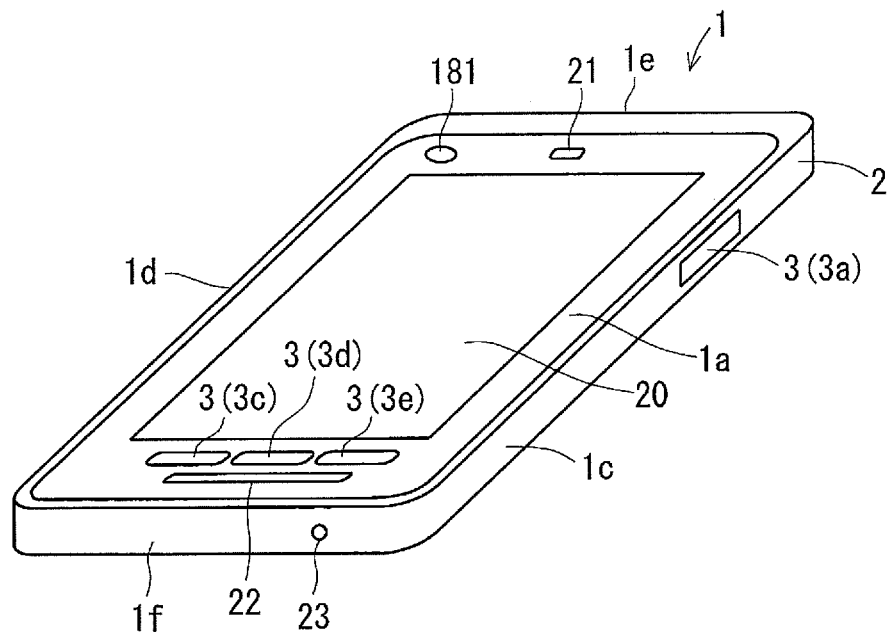
FIG. 1 illustrates a perspective view of an example of appearance of an electronic apparatus.
Figure 2:
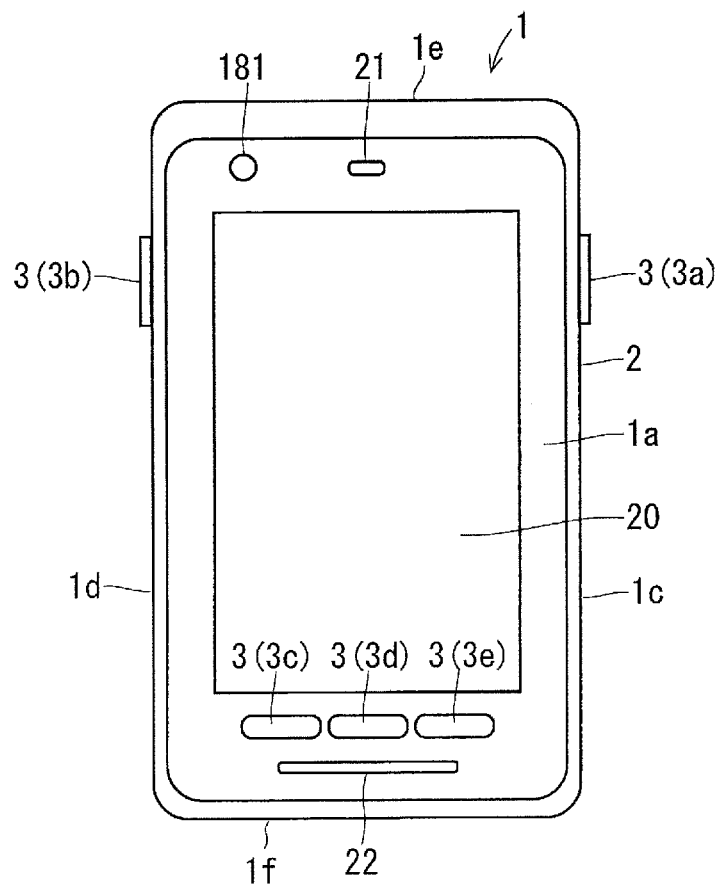
FIG. 2 illustrates a front view of an example of appearance of the electronic apparatus.
Figure 3:
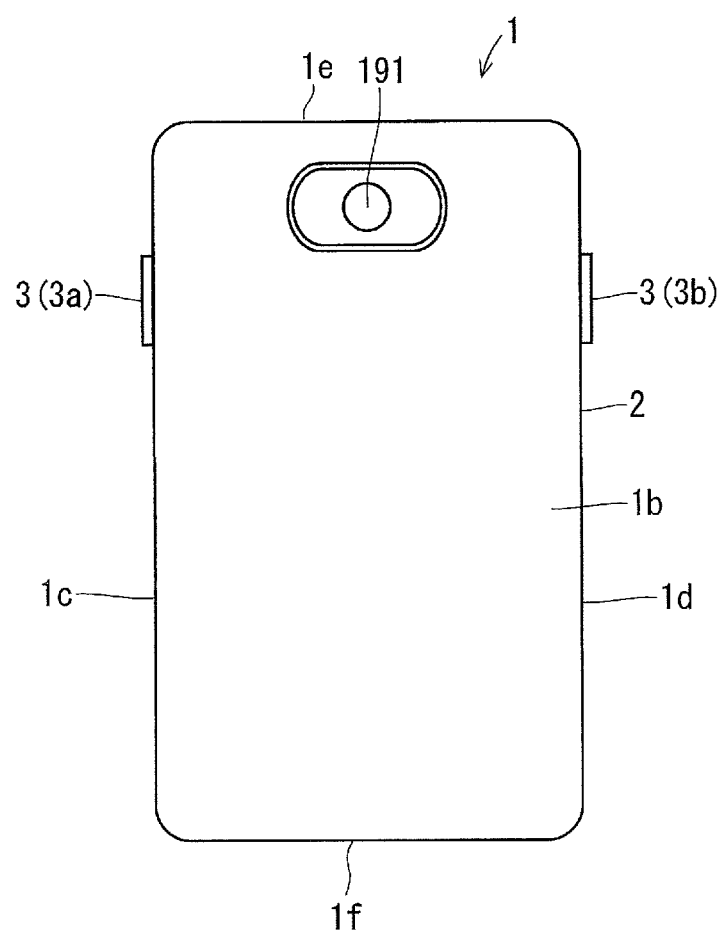
FIG. 3 illustrates a rear view of an example of appearance of the electronic apparatus.

FIGS. 1, 2, and 3 are respectively a perspective view, a front view, and a rear view of an example of appearance of an electronic apparatus 1. As illustrated in FIGS. 1 to 3, the electronic apparatus 1 includes an apparatus case 2 having an approximately rectangular plate-like shape in plan view, for example. The apparatus case 2 forms the exterior of the electronic apparatus 1. A front surface 1a of the electronic apparatus 1, namely, a front surface of the apparatus case 2 includes a display area 20 in which a variety of information, such as characters, signs, and graphics, is displayed. On a rear surface of the display area 20 is located a touch panel 130, which will be described below. A user can input a variety of information into the electronic apparatus 1 by performing an operation on the display area 20 with, for example, a finger. The user can also input a variety of information into the electronic apparatus 1 by performing an operation on the display area 20 with an operator other than fingers that is, for example, a pen for touch panels such as a stylus pen.

The electronic apparatus 1 has a right side surface 1c, a left side surface 1d, an upper side surface 1e, and a lower side surface 1f. A right side surface, a left side surface, an upper side surface, and a lower side surface of the apparatus case 2 respectively form the right side surface 1c, the left side surface 1d, the upper side surface 1e, and the lower side surface 1f of the electronic apparatus 1.

In an upper edge portion of the front surface 1a of the electronic apparatus 1 (the front surface of the apparatus case 2) is located a receiver hole 21. In a lower edge portion of the front surface 1a of the electronic apparatus 1 is located a speaker hole 22. In the lower side surface 1f of the electronic apparatus 1 is located a microphone hole 23.

Through the upper edge portion of the front surface 1a of the electronic apparatus 1, a lens 181 of a first camera 180, which will be described below, can be visually recognized. As illustrated in FIG. 3, through an upper edge portion of a rear surface 1b of the electronic apparatus 1, a lens 191 of a second camera 190, which will be described below, can be visually recognized.

The electronic apparatus 1 includes a plurality of operation buttons 3. The individual operation buttons 3 are hardware buttons. Specifically, the individual operation buttons 3 are push buttons. The operation buttons may also be referred to as "hardware keys", "operation keys", or "keys". The individual operation buttons 3 have functions assigned thereto. In other words, the individual operation buttons 3 are associated with various types of processing performed by the electronic apparatus 1.

An operation performed on the operation buttons 3 includes, for example, a short press operation and a long press operation. The short press operation refers to an operation of pressing any operation button 3 to turn on the operation button 3, and, shortly thereafter, releasing the operation button 3 to turn off the operation button 3. The long press operation refers to an operation of pressing any operation button 3 to turn on the operation button 3, and, sometime thereafter, releasing the operation button 3 to turn off the operation button 3.

Pressing the operation button 3 hereinafter means pressing the operation button 3 until the operation button 3 is turned on, unless otherwise noted. Releasing the operation button 3 hereinafter means releasing the operation button 3 to turn off the operation button 3, unless otherwise noted. The short press operation and the long press operation may also collectively simply be referred to as a "press operation".

The plurality of operation buttons 3 include operation buttons 3a to 3e. The operation button 3a is, for example, a power button. The power button is an operation button for suspending some functions or restoring (activating) the suspended functions of the electronic apparatus 1. The operation button 3a is located, for example, in the right side surface 1c of the electronic apparatus 1. The user performs the press operation on the operation button 3a to suspend some functions or restore the suspended functions of the electronic apparatus 1. The electronic apparatus 1 performs different types of processing when the short press operation is performed on the operation button 3a and when the long press operation is performed on the operation button 3a as will be described below. The operation button 3a may hereinafter also be referred to as a "power button 3a".

The operation button 3b is, for example, an operation button for executing an application (application program) assigned thereto. The operation button 3b is located, for example, in the left side surface 1d of the electronic apparatus 1. The user performs the press operation on the operation button 3b to cause the electronic apparatus 1 to execute an application assigned to the operation button 3b. The user can cause the electronic apparatus 1 to change the application assigned to the operation button 3b by performing an operation on the display area 20.

The operation button 3c is, for example, a back button. The back button is an operation button for switching the display in the display area 20 to the immediately preceding display. The operation button 3c is located, for example, in the lower edge portion of the front surface of the electronic apparatus 1. The user performs the press operation on the operation button 3c to switch the display in the display area 20 to the immediately preceding display. The operation button 3c may hereinafter also be referred to as a "back button 3c".

The operation button 3d is, for example, a home button. The home button is an operation button for displaying a home screen in the display area 20. The operation button 3d is located, for example, in the lower edge portion of the front surface of the electronic apparatus 1. The user performs the press operation on the operation button 3d to display the home screen in the display area 20. The operation button 3d may hereinafter also be referred to as a "home button 3d".

The operation button 3e is, for example, a history button. The history button is an operation button for displaying, in the display area 20, a history of applications executed by the electronic apparatus 1. The operation button 3e is located, for example, in the lower edge portion of the front surface of the electronic apparatus 1. The user performs the press operation on the operation button 3e to display, in the display area 20, the history of applications executed by the electronic apparatus 1.

<Electrical Configuration of Electronic Apparatus>

Figure 4:
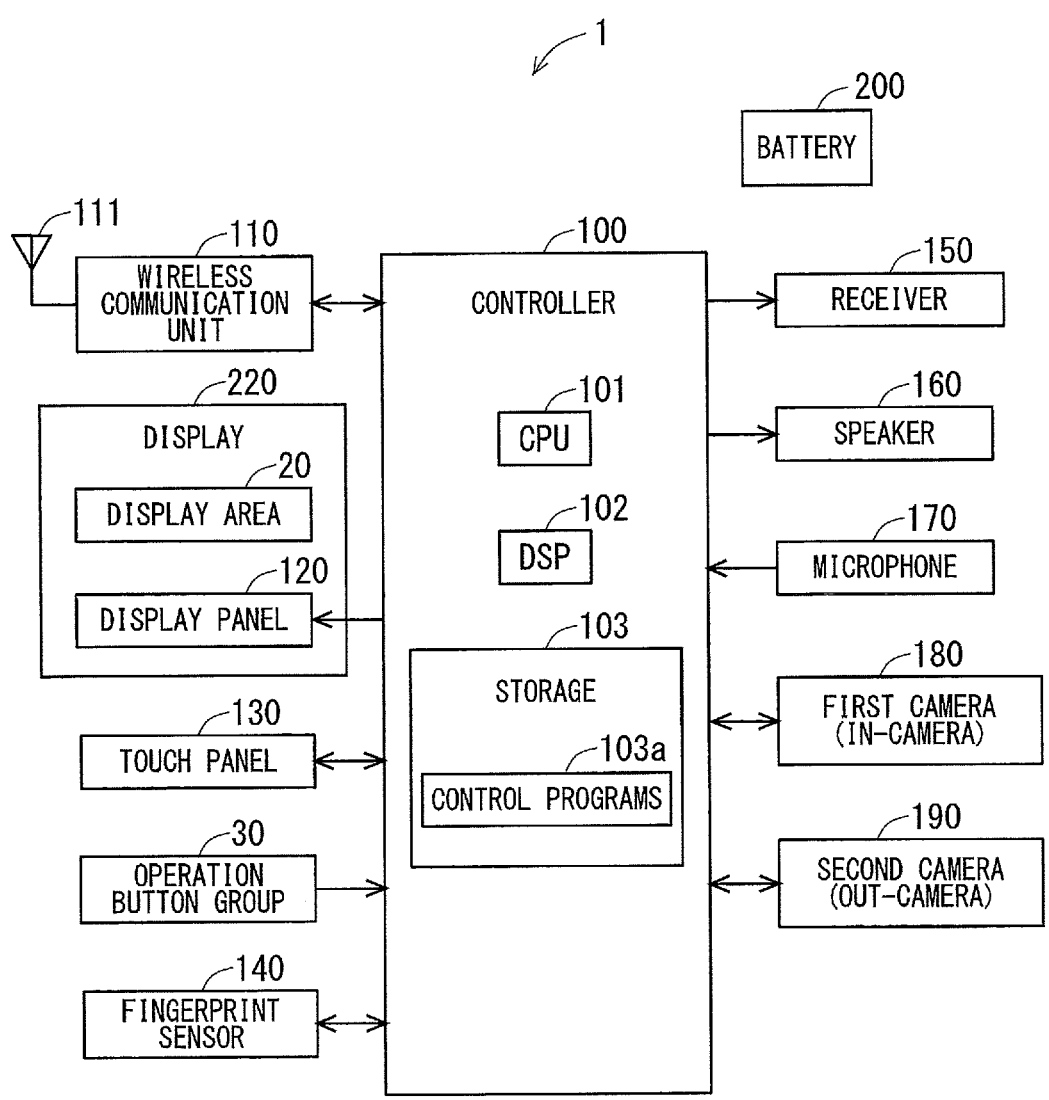
FIG. 4 illustrates a block diagram of an example of the configuration of the electronic apparatus.

FIG. 4 is a block diagram mainly showing an example of the electrical configuration of the electronic apparatus 1. As shown in FIG. 4, the electronic apparatus 1 includes a controller 100, a wireless communication unit 110, a display 220, the touch panel 130, an operation button group 30, and a fingerprint sensor 140. The electronic apparatus 1 further includes a receiver 150, a speaker 160, a microphone 170, the first camera 180, the second camera 190, and a battery 200. These components of the electronic apparatus 1 are accommodated in the apparatus case 2.

The controller 100 can manage the overall operation of the electronic apparatus 1 by controlling other components of the electronic apparatus 1. The controller 100 may also be referred to as a control device. The controller 100 includes at least one processor for providing control and processing capability to perform various functions as will be described in further detail below.

In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g., discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In this example, the controller 100 includes a central processing unit (CPU) 101, a digital signal processor (DSP) 102, and a storage 103. The storage 103 includes a non-transitory recording medium, such as a read only memory (ROM) and a random access memory (RAM), that can be read by the CPU 101 and the DSP 102. The ROM included in the storage 103 is, for example, a flash ROM (flash memory), which is a nonvolatile memory. The storage 103 can store a plurality of control programs 103a for controlling the electronic apparatus 1. The CPU 101 and the DSP 102 execute the various control programs 103a stored in the storage 103 to perform the various functions of the controller 100.

Some or all of the functions of the controller 100 may be performed by a hardware circuit that requires no software in performing the functions of the hardware circuit. The storage 103 may include a non-transitory computer readable recording medium other than the ROM and the RAM. The storage 103 may include, for example, a compact hard disk drive and a solid state drive (SSD).

The plurality of control programs 103a stored in the storage 103 include various applications (application programs). The storage 103 stores, for example, a call application for performing voice calls and video calls, a browser for displaying websites, and an e-mail application for creating, reading, transmitting, and receiving e-mails. The storage 103 also stores a camera application for capturing images of subjects using the first camera 180 and the second camera 190, a recorded image display application for displaying still images and moving images recorded in the storage 103, and a music playback control application for controlling playback of music data stored in the storage 103. At least one of the applications stored in the storage 103 may be an application presorted in the storage 103. At least one of the applications stored in the storage 103 may be an application downloaded by the electronic apparatus 1 from another apparatus and stored in the storage 103.

The wireless communication unit 110 includes an antenna 111. The wireless communication unit 110 can perform, using the antenna 111, wireless communication through control performed by the controller 100. The wireless communication unit 110 can receive, using the antenna 111, a signal transmitted from a mobile phone other than the electronic apparatus 1 or a signal transmitted from a communication apparatus, such as a web server, connected to the Internet, via a base station and the like. The wireless communication unit 110 can perform amplification and down-conversion on the received signal, and output the resultant signal to the controller 100. The controller 100 can perform demodulation and the like on the received signal as input to acquire user data, control data, and the like included in the received signal. The wireless communication unit 110 can also perform up-conversion and amplification on a transmission signal generated by the controller 100 and including user data, control data, and the like, and wirelessly transmit the processed transmission signal from the antenna 111. The transmission signal transmitted from the antenna 111 is received, via the base station and the like, by the mobile phone other than the electronic apparatus 1 or the communication apparatus connected to the Internet or the like.

The display 220 includes a display panel 120 and the display area 20 of the front surface 1a of the electronic apparatus 1. The display 220 can display a variety of information in the display area 20. The display panel 120 is, for example, a liquid crystal display panel or an organic EL panel. The display panel 120 can display a variety of information, such as characters, signs, and graphics, through control performed by the controller 100. The display panel 120 faces the display area 20 in the apparatus case 2. The information displayed by the display panel 120 appears in the display area 20.

The touch panel 130 can detect an operation performed on the display area 20 with an operator, such as a finger. The touch panel 130 is, for example, a projected capacitive touch panel. The touch panel 130 is located, for example, behind the display area 20. When the user performs an operation on the display area 20 with an operator, such as a finger, the touch panel 130 can input an electrical signal corresponding to the operation into the controller 100. The controller 100 can specify details of the operation performed on the display area 20 based on the electrical signal (output signal) input by the touch panel 130. The controller 100 can perform processing in accordance with the specified details of the operation.

Upon being pressed, each of the operation buttons 3 of the operation button group 30 can output, to the controller 100, an on signal indicating that the operation button 3 has been pressed. Upon being released, each of the operation buttons 3 can output, to the controller 100, an off signal indicating that the operation button 3 has been released. The controller 100 can measure a period of time elapsed from receipt of the on signal from the operation button 3 until the controller receives the off signal from the operation button 3. When the elapsed period of time acquired with respect to the operation button 3 becomes equal to or greater than a threshold for long press determination, the controller 100 determines that the long press operation has been performed on the operation button 3. On the other hand, when the controller 100 receives the off signal from the operation button 3 before the elapsed period of time acquired with respect to the operation button 3 becomes equal to or greater than the threshold for long press determination, the controller 100 determines that the short press operation has been performed on the operation button 3. The controller 100 may determine that the long press operation has been performed on the operation button 3 when the elapsed period of time acquired with respect to the operation button 3 becomes greater than the threshold for long press determination. The elapsed period of time may hereinafter also be referred to as an "operation time".

When the press operation is performed on the operation button 3, the controller 100 can perform processing in accordance with the press operation. The controller 100 controls other components in accordance with the press operation performed on the operation button 3, so that the electronic apparatus 1 can perform processing (a function) associated with the operation button 3 on which the press operation has been performed.

The microphone 170 can convert a sound input from the outside of the electronic apparatus 1 into an electrical sound signal, and output the electrical sound signal to the controller 100. The sound from the outside of the electronic apparatus 1 is received through the microphone hole 23 into the electronic apparatus 1 to be input into the microphone 170.

The speaker 160 is, for example, a dynamic speaker. The speaker 160 can convert an electrical sound signal from the controller 100 into a sound, and output the sound. The sound output from the speaker 160 is output through the speaker hole 22 to the outside. The user can hear the sound output through the speaker hole 22 even at a location away from the electronic apparatus 1.

The receiver 150 can output a received sound. The receiver 150 is, for example, a dynamic speaker. The receiver 150 can convert an electrical sound signal from the controller 100 into a sound, and output the sound. The sound output from the receiver 150 is output through the receiver hole 21 to the outside. The volume of the sound output through the receiver hole 21 is lower than the volume of the sound output through the speaker hole 22. The user can hear the sound output through the receiver hole 21 by bringing the receiver hole 21 close to his/her ear. A vibrating element, such as a piezoelectric vibrating element, vibrating a front surface portion of the apparatus case 2 may be provided in place of the receiver 150. In this case, the sound is transferred to the user by vibration of the front surface portion.

The battery 200 can output power for the electronic apparatus 1. The battery 200 is, for example, a rechargeable battery. The power output from the battery 200 is supplied to various components of the electronic apparatus 1, such as the controller 100 and the wireless communication unit 110.

The first camera 180 includes the lens 181, an image sensor, and the like. The second camera 190 includes the lens 191, an image sensor, and the like. The first camera 180 and the second camera 190 can each capture an image of a subject based on control performed by the controller 100, create a still image or a moving image showing the captured image of the subject, and output the still image or the moving image to the controller 100.

The lens 181 of the first camera 180 can be visually recognized from the front surface 1a of the electronic apparatus 1. The first camera 180 can thus capture an image of a subject in front of the front surface 1a (display area 20) of the electronic apparatus 1. The first camera 180 having such a function may also be referred to as an "in-camera". The lens 191 of the second camera 190 can be visually recognized from the rear surface 1b of the electronic apparatus 1. The second camera 190 can thus capture an image of a subject in front of the rear surface 1b of the electronic apparatus 1. The second camera 190 having such a function may also be referred to as an "out-camera".

The fingerprint sensor 140 can detect a fingerprint of a finger touching the electronic apparatus 1. For example, the fingerprint sensor 140 can detect a fingerprint of a finger touching the power button 3a.

Touching the operation button 3 herein includes both touching the operation button 3 not to turn on the operation button 3 and touching the operation button 3 to turn on the operation button 3.

The fingerprint sensor 140 can detect a fingerprint of a finger touching a portion of the power button 3a exposed from the apparatus case 2. The portion of the power button 3a exposed from the apparatus case 2 is a fingerprint detection area. As will be described below, the controller 100 can perform fingerprint authentication based on a fingerprint detection result obtained by the fingerprint sensor 140. The fingerprint sensor 140 outputs, as the fingerprint detection result, a fingerprint image showing the detected fingerprint, for example. The fingerprint sensor 140 detects the fingerprint, for example, using a capacitive sensing method. The fingerprint sensor 140 may detect the fingerprint using a method other than the capacitive sensing method, such as an optical method. The fingerprint detected by the fingerprint sensor 140 may hereinafter also be referred to as a "detected fingerprint".

<Operation Modes of Electronic Apparatus>

The electronic apparatus 1 has many operation modes. The operation mode of the electronic apparatus 1 includes, for example, a normal mode, a sleep mode, and a shutdown mode. In the shutdown mode, the electronic apparatus 1 is shut down, and most functions of the electronic apparatus 1 are suspended. In the sleep mode, some functions of the electronic apparatus 1, including a display function, are suspended. Operating in the normal mode means that the electronic apparatus 1 operates in a mode other than the sleep mode and the shutdown mode. The controller 100 sets the operation mode of the electronic apparatus 1 by controlling predetermined components of the electronic apparatus 1 in accordance with the operation mode to be set.

In the sleep mode, some components of the electronic apparatus 1, such as the display panel 120, the touch panel 130, and the fingerprint sensor 140, do not operate, for example. In the shutdown mode, most components of the electronic apparatus 1, including the display panel 120, the touch panel 130, the fingerprint sensor 140, and the like, do not operate. In the sleep mode and in the shutdown mode, no information is displayed in the display area 20. In the sleep mode, the electronic apparatus 1 consumes less power than in the normal mode. In the shutdown mode, the electronic apparatus 1 consumes less power than in the sleep mode.

If no operation is performed on the electronic apparatus 1 for a given period of time or more in the normal mode, the operation mode transitions from the normal mode to the sleep mode. The operation mode also transitions from the normal mode to the sleep mode when the short press operation is performed on the power button 3a in the normal mode.

On the other hand, when the short press operation is performed on the power button 3a in the sleep mode, the operation mode transitions from the sleep mode to the normal mode. This means that, when the short press operation is performed on the power button 3a in the sleep mode, the functions suspended at transition to the sleep mode are restored in the electronic apparatus 1. When the short press operation is performed on the home button 3d in the sleep mode, the operation mode transitions from the sleep mode to the normal mode. The home button 3d functions in the sleep mode as an operation button for canceling the sleep mode.

Operation modes of the electronic apparatus 1 other than the shutdown mode and the sleep mode described below are included in the normal mode even though not specifically described. The operation mode means the operation mode of the electronic apparatus 1.

<Screens Displayed in Display Area>

Figure 5:
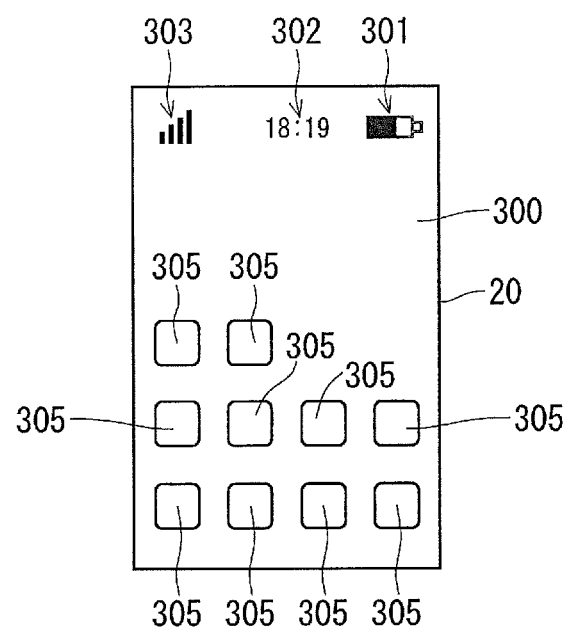
FIG. 5 illustrates an example of the display of the electronic apparatus.
Figure 6:
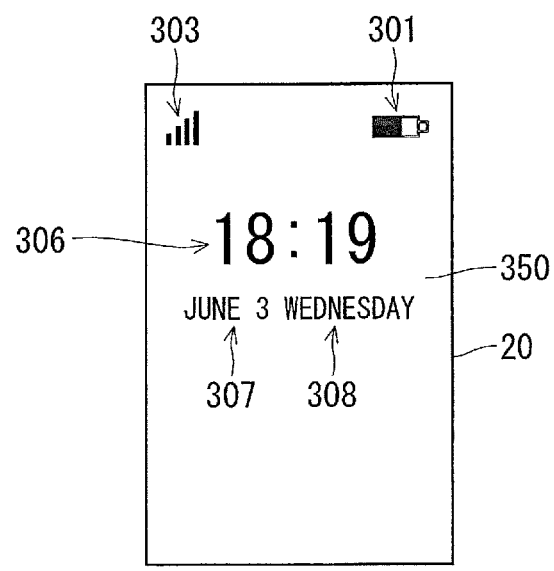
FIG. 6 illustrates an example of the display of the electronic apparatus.

In the normal mode, various screens are displayed in the display area 20. For example, a home screen or a lock screen is displayed in the display area 20. FIG. 5 illustrates an example of a home screen 300. FIG. 6 illustrates an example of a lock screen 350.

As illustrated in FIG. 5, a battery level icon 301 indicating the current capacity of the battery 200, a current time 302, and a reception status icon (may also be referred to as a radio wave status icon) 303 indicating a radio wave reception status of the wireless communication unit 110 are shown on the home screen 300. Icons (may hereinafter be referred to as "application icons") 305 corresponding to respective applications to execute the corresponding applications are also shown on the home screen 300. In an example of FIG. 5, ten application icons 305 are shown. When the user performs a predetermined operation (e.g., a tap operation) on any of the application icons 305, the controller 100 reads, from the storage 103, an application corresponding to the application icon 305 on which the operation has been performed, and executes the application. The user can thus cause the electronic apparatus 1 to execute the application corresponding to the application icon 305 on which the operation has been performed by performing the operation on the application icon 305. For example, when the user performs the tap operation on the application icon 305 corresponding to the browser, the electronic apparatus 1 executes the browser. When the user performs the tap operation on the application icon 305 corresponding to the camera application, the electronic apparatus 1 executes the camera application. The application icons 305 are software buttons displayed in the display area 20.

As illustrated in FIG. 6, the battery level icon 301 and the reception status icon 303 are shown on the lock screen 350 as on the home screen 300. A current time 306, a current date 307, and a current day of week 308 are also shown on the lock screen 350. On the lock screen 350, the time 306 is shown at a location different from the location of the time 302 shown on the home screen 300 to have a larger size than the time 302.

The normal mode herein includes a lock mode in which the user cannot cause the electronic apparatus 1 to execute any applications other than specific applications (e.g., the call application and the camera application) of a plurality of applications stored in the storage 103. In the lock mode, the user cannot instruct the electronic apparatus 1 to execute each of the applications other than the specific applications of the plurality of applications stored in the storage 103. The lock screen 350 is a screen indicating that the electronic apparatus 1 is in the lock mode, and is displayed in the display area 20 when the electronic apparatus 1 is in the lock mode. In the lock mode, the user may not be able to cause the electronic apparatus 1 to execute all the applications stored in the storage 103.

When the short press operation is performed on the power button 3a in the sleep mode, the sleep mode is canceled, and the operation mode of the electronic apparatus 1 transitions to the lock mode. The lock screen 350 is thus displayed in the display area 20. When the short press operation is performed on the home button 3d in the sleep mode, the sleep mode is canceled, and the operation mode of the electronic apparatus 1 transitions to the lock mode. The lock screen 350 is thus displayed in the display area 20.

When the short press operation is performed on the home button 3d in a case where the operation mode of the electronic apparatus 1 is the normal mode and not the lock mode, the home screen 300 is displayed in the display area 20.

When the user performs a predetermined operation on the electronic apparatus 1 during display of the lock screen 350 in the display area 20, the lock mode of the electronic apparatus 1 is canceled, and the display in the display area 20 transitions from the lock screen 350 to another screen, such as the home screen 300. A state in which the lock mode has been canceled in the normal mode may hereinafter also be referred to as an "unlock mode".

When the long press operation is performed on the power button 3a, a dialog box 360 for shutdown is displayed in the display area 20. FIG. 7 illustrates an example of the dialog box 360.

In an example of FIG. 7, the dialog box 360 is displayed to overlap the lock screen 350. When the long press operation is performed on the power button 3a in a case where the operation mode is the lock mode, the dialog box 360 is displayed to overlap the lock screen 350 as illustrated in FIG. 7. When the long press operation is performed on the power button 3a in a case where the operation mode is the sleep mode, the operation mode transitions to the lock mode to display the lock screen 350 in the display area 20, and then the dialog box 360 is displayed to overlap the lock screen 350. It can be said that the dialog box 360 is information displayed in response to the long press operation performed on the power button 3a.

The dialog box 360 includes a plurality of buttons 361 to 363 and 367. The button 361 is a software button for setting the operation mode to the shutdown mode. When the tap operation is performed on the button 361, for example, the operation mode is set to the shutdown mode.

The button 362 is a software button for rebooting the electronic apparatus 1. When the tap operation is performed on the button 362, for example, the electronic apparatus 1 reboots. When the electronic apparatus 1 reboots, the operation mode temporarily becomes the shutdown mode, and then becomes the lock mode.

The button 363 is a software button for setting the operation mode to an airplane mode. When the tap operation is performed on the button 363, for example, the operation mode is set to the airplane mode. In the airplane mode, a communication function of the electronic apparatus 1 is suspended.

The button 367 is a software button for removing display of the dialog box 360. When the tap operation is performed on the button 367, for example, display of the dialog box 360 is removed.

The dialog box 360 further includes buttons 364 to 366 for providing settings relating to notification of an incoming call, an incoming e-mail, and the like. The button 365 is a software button for setting the operation mode to a vibration mode. When the tap operation is performed on the button 365, for example, the operation mode is set to the vibration mode. In the vibration mode, the user is notified of the incoming call, the incoming e-mail, and the like by vibration of the apparatus case 2 of the electronic apparatus 1. In the vibration mode, ringtones indicating the incoming call, the incoming e-mail, and the like are not output from the speaker 160. The electronic apparatus 1 includes the vibrating element (not illustrated), and the vibrating element vibrates to thereby vibrate the apparatus case 2.

The button 364 is a software button for setting the operation mode to a mute mode. When the tap operation is performed on the button 364, for example, the operation mode of the electronic apparatus 1 is set to the mute mode. In the mute mode, ringtones indicating the incoming call, the incoming e-mail, and the like are not output from the speaker 160. In the mute mode, the apparatus case 2 does not vibrate even when there are the incoming call, the incoming e-mail, and the like.

The button 366 is a software button for setting the operation mode to a speaker on mode. When the tap operation is performed on the button 366, for example, the operation mode is set to the speaker on mode. In the speaker on mode, ringtones indicating the incoming call, the incoming e-mail, and the like are output from the speaker 160. In the speaker on mode, the apparatus case 2 does not vibrate even when there are the incoming call, the incoming e-mail, and the like.

When the long press operation is performed on the power button 3a during display of the home screen 300 in the display area 20, the dialog box 360 is displayed to overlap the home screen 300.

<Fingerprint Authentication>

The normal mode includes a fingerprint authentication mode. In the fingerprint authentication mode, the controller 100 determines whether the power button 3a is being touched with a finger. When the controller 100 determines that the power button 3a is being touched with the finger, the controller 100 performs fingerprint authentication based on the fingerprint detection result obtained by the fingerprint sensor 140. In the fingerprint authentication mode, the controller 100 repeatedly determines whether the power button 3a is being touched with the finger based on an output signal from the fingerprint sensor 140.

The controller 100 performs the fingerprint authentication, for example, when the electronic apparatus 1 is in the lock mode. When the operation mode is set to the lock mode, the operation mode is also set to the fingerprint authentication mode. The controller 100 thus performs the fingerprint authentication when determining that the power button 3a is being touched with the finger during display of the lock screen 350. If the fingerprint authentication succeeds, the lock mode and the fingerprint authentication mode are canceled. The controller 100 starts the fingerprint authentication when determining that the power button 3a is being touched with the finger, and thus it can be said that touching the power button 3a with the finger is an instruction for the electronic apparatus 1 to perform the fingerprint authentication.

In performing the fingerprint authentication, the controller 100 first extracts, from the fingerprint image output from the fingerprint sensor 140 as the fingerprint detection result, a feature point representing features of the detected fingerprint shown by the fingerprint image. The feature point includes, for example, the locations of an end point and a branch point of a ridge line (protrusion) of the fingerprint and the thickness of the ridge line. The controller 100 compares the extracted feature point with a reference feature point stored in the storage 103. The reference feature point is a feature point extracted from a fingerprint image showing a fingerprint of an authorized user (e.g., the owner of the electronic apparatus 1). The controller 100 determines that the fingerprint authentication has succeeded if the extracted feature point and the reference feature point are similar to each other as a result of comparison. The fingerprint authentication is one type of user authentication, and thus it can be said that the controller 100 determines that the user having the fingerprint detected by the fingerprint sensor 140 is the authorized user if the extracted feature point and the reference feature point are similar to each other. On the other hand, the controller 100 determines that the fingerprint authentication has failed if the extracted feature point and the reference feature point are not similar to each other. This means that the controller 100 determines that the user having the fingerprint detected by the fingerprint sensor 140 is an unauthorized user.

The normal mode includes a fingerprint registration mode for registering the fingerprint of the user in the electronic apparatus 1. The electronic apparatus 1 operates in the fingerprint registration mode when a predetermined operation is performed on the display area 20 in the unlock mode. When the authorized user places his/her finger on the power button 3a in the fingerprint registration mode, the fingerprint sensor 140 detects the fingerprint of the finger, and outputs the fingerprint image showing the detected fingerprint. The controller 100 extracts a feature point from the fingerprint image output from the fingerprint sensor 140, and stores the extracted feature point in the storage 103 as the reference feature point. The reference feature point representing features of the fingerprint of the authorized user is thus stored in the storage 103. This means that the fingerprint of the authorized user is registered in the electronic apparatus 1.

In some cases, a plurality of reference feature points are stored in the storage 103. In such cases, the controller 100 compares the extracted feature point with each of the plurality of reference feature points stored in the storage 103. The controller 100 determines that the fingerprint authentication has succeeded if the extracted feature point is similar to any of the plurality of reference feature points. On the other hand, the controller 100 determines that the fingerprint authentication has failed if the extracted feature point is similar to none of the plurality of reference feature points.

Figure 8:
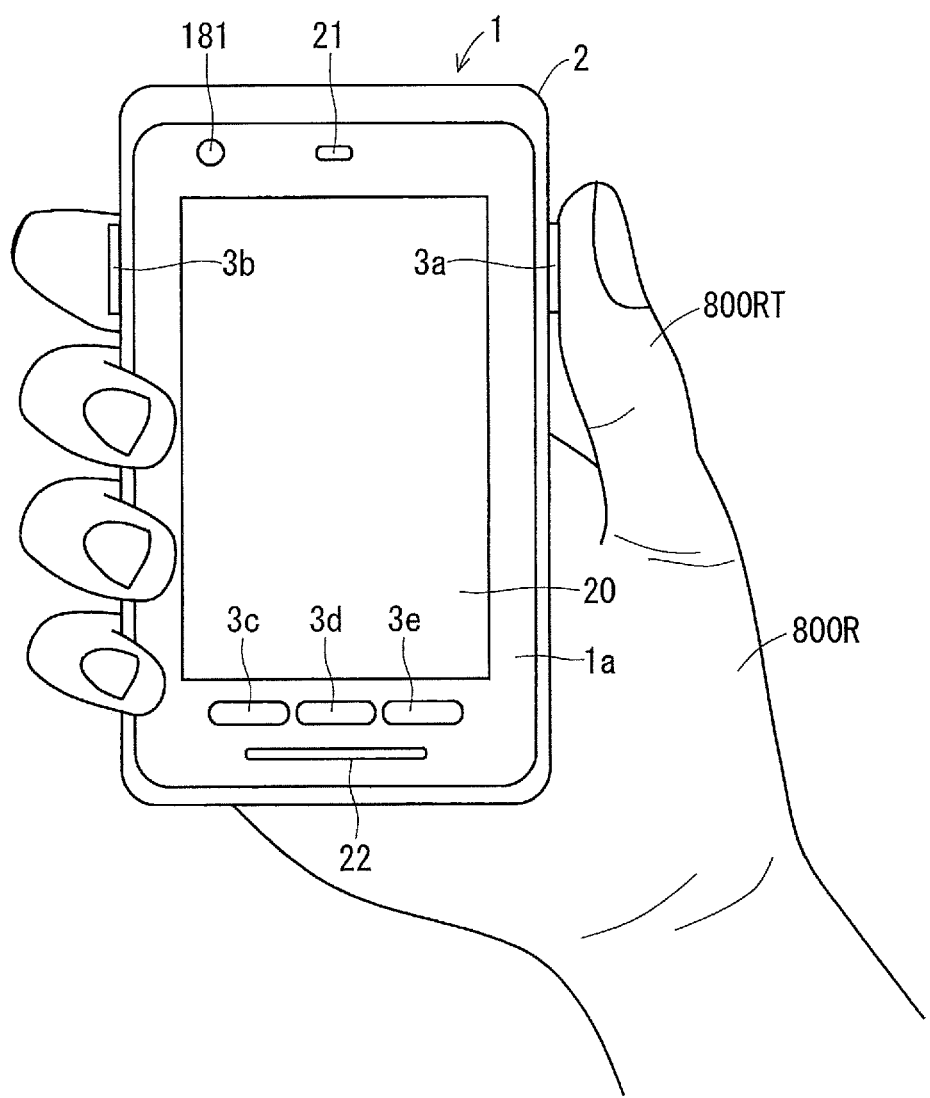
FIG. 8 illustrates an example of how a user holds the electronic apparatus.

As described above, the electronic apparatus 1 performs the fingerprint authentication of the finger touching the power button 3a in the lock mode, and thus the authorized user can cause the electronic apparatus 1 to cancel the lock mode by touching the power button 3a with the finger during display of the lock screen 350. When the reference feature point corresponding to a fingerprint of a right-hand thumb 800RT of the authorized user is stored in the storage 103, for example, the authorized user can cause the electronic apparatus 1 to cancel the lock mode by touching the power button 3a of the electronic apparatus 1 held in a right hand 800R with the right-hand thumb 800RT, as illustrated in FIG. 8.

Figure 9:
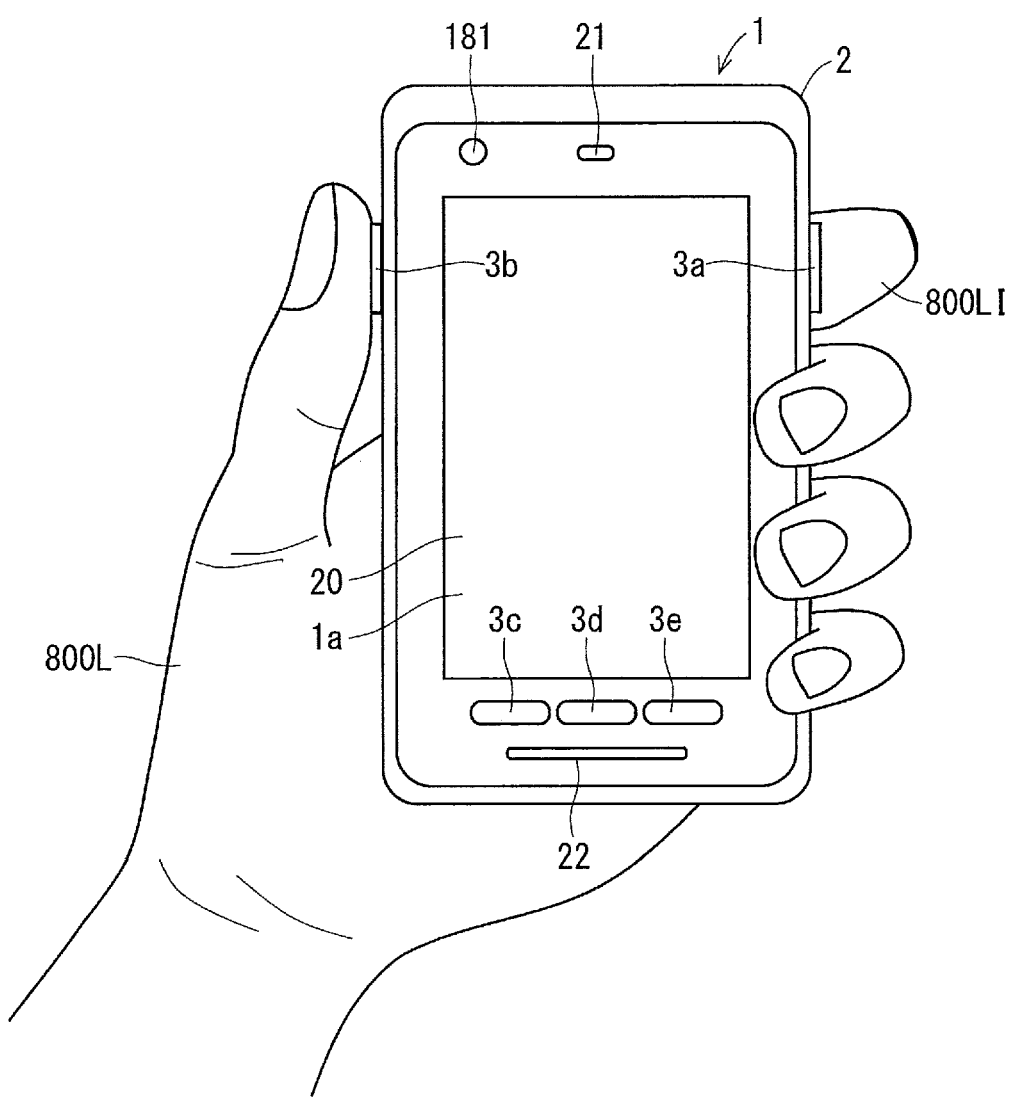
FIG. 9 illustrates an example of how the user holds the electronic apparatus.

When the reference feature point corresponding to a fingerprint of a left-hand index finger 800LI of the authorized user is stored in the storage 103, the authorized user can cause the electronic apparatus 1 to cancel the lock mode by touching the power button 3a of the electronic apparatus 1 held in a left hand 800L with the left-hand index finger 800LI, as illustrated in FIG. 9.

When the lock mode is canceled during display of the lock screen 350 in the display area 20, a screen (e.g., the home screen) other than the lock screen 350 is displayed in the display area 20.

Figure 10:
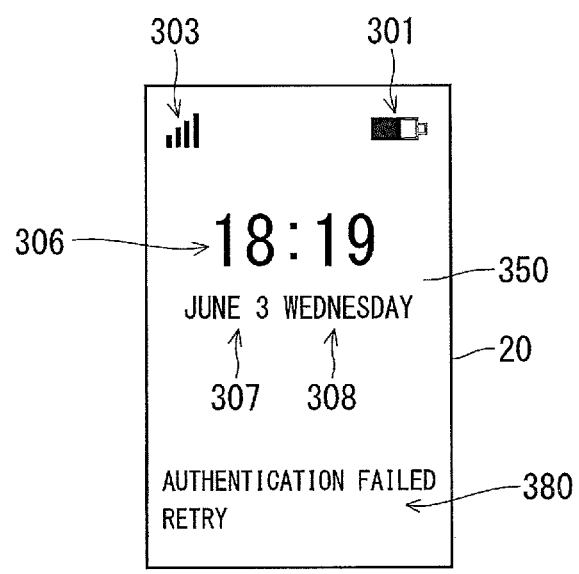
FIG. 10 illustrates an example of the display of the electronic apparatus.

If the fingerprint authentication fails, the controller 100 causes the display 220 to display authentication failed information 380 that is notification information notifying the user that the fingerprint authentication has failed. FIG. 10 illustrates a display example of the authentication failed information 380. If the fingerprint authentication fails during display of the lock screen 350 in the display area 20, the lock mode is not canceled, and the authentication failed information 380 is shown on the lock screen 350 as illustrated in FIG. 10. In an example of FIG. 10, the authentication failed information 380 indicates that the fingerprint authentication has failed and the power button 3a is required to be touched again with the finger.

When the user releases the finger from the power button 3a, and touches the power button 3a again with the finger after display of the authentication failed information 380, the controller 100 performs the fingerprint authentication.

The electronic apparatus 1 may perform the fingerprint authentication of a finger touching the operation button 3 other than the power button 3a. For example, a case where the fingerprint sensor 140 can detect a fingerprint of a finger touching the home button 3d is considered. In this case, the controller 100 may perform the fingerprint authentication of the finger touching the home button 3d based on the fingerprint detection result obtained by the fingerprint sensor 140. A case where the fingerprint sensor 140 can detect a fingerprint of a finger touching the operation button 3b is considered. In this case, the controller 100 may perform the fingerprint authentication of the finger touching the operation button 3b based on the fingerprint detection result obtained by the fingerprint sensor 140. When the fingerprint sensor 140 can detect, for each of the plurality of operation buttons 3, a fingerprint of a finger touching the operation button 3, the controller 100 may perform, for each of the plurality of operation buttons 3, the fingerprint authentication of the finger touching the operation button 3.

The operation button 3, such as the power button 3a, touched with the finger having the fingerprint detected by the fingerprint sensor 140 and being the target of the fingerprint authentication may hereinafter also be referred to as an "authentication button".

<Fingerprint Authentication at Press Operation Performed on Power Button>

When the user performs the short press operation on the power button 3a immediately after starting touching the power button 3a in a case where the operation mode is the lock mode, the controller 100 starts the fingerprint authentication, but the operation mode transitions to the sleep mode before completion of the fingerprint authentication.

When the long press operation is performed on the power button 3a in a case where the operation mode is the lock mode, the controller 100 completes the fingerprint authentication before the operation time becomes equal to or greater than the threshold for long press determination. Thus, if the fingerprint authentication succeeds, the lock mode is canceled, and the dialog box 360 for shutdown is not displayed in the display area 20. On the other hand, if the controller 100 determines that the fingerprint authentication has failed, the controller 100 causes the display 220 to display the dialog box 360 for shutdown when the operation time becomes equal to or greater than the threshold for long press determination after determination. In this case, the controller 100 causes the display 220 to display not only the dialog box 360 but also the authentication failed information 380 as the fingerprint authentication has failed. In this example, the controller 100 causes the display 220 to start displaying the authentication failed information 380, and then causes the display 220 to start displaying the dialog box 360. The fingerprint authentication is completed, for example, in less than 0.5 seconds from the start thereof. The threshold for long press determination is set, for example, to two or three seconds.

Figure 12:
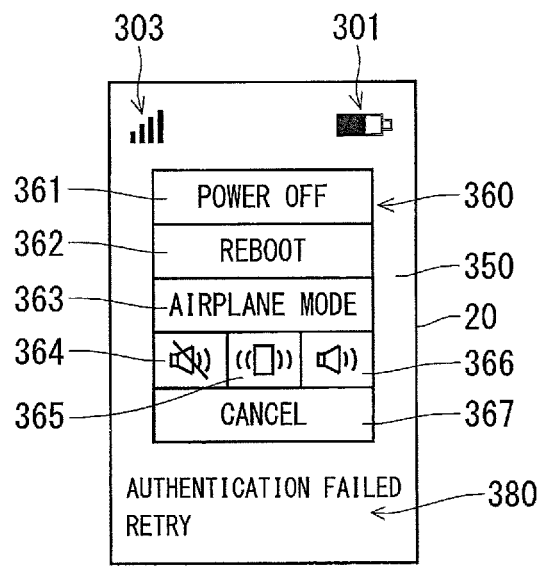
FIG. 12 illustrates an example of the display of the electronic apparatus.

FIG. 11 is a flowchart showing an example of the operation of the electronic apparatus 1 when the long press operation is performed on the power button 3a in a case where the operation mode is the lock mode. As shown in FIG. 11, when the power button 3a is pressed in a case where the operation mode is the lock mode (the operation mode is the fingerprint authentication mode at the same time) (step s1), the controller 100 determines that the power button 3a is being touched with the finger based on the output signal from the fingerprint sensor 140 in step s2. The controller 100 starts the fingerprint authentication in step s3. Upon completion of the fingerprint authentication in step s4, the controller 100 determines whether the fingerprint authentication has succeeded or failed in step s5. If the controller 100 determines that the fingerprint authentication has succeeded, the lock mode is canceled (the fingerprint authentication mode is also canceled) in step s6. On the other hand, if the controller 100 determines that the fingerprint authentication has failed, the controller 100 causes the display 220 to display the authentication failed information 380 in step s7 as illustrated in FIG. 10 described above. Display of the authentication failed information 380 thus starts. When the controller 100 determines that the operation time becomes equal to or greater than the threshold for long press determination, the controller 100 determines that the long press operation has been performed on the power button 3a in step s8. The controller 100 causes the display 220 to display the dialog box 360 as illustrated in FIG. 12 in step s9. Display of the dialog box 360 thus starts in accordance with the long press operation performed on the power button 3a after the start of display of the authentication failed information 380. This means that the display in the display area 20 becomes the display as illustrated in FIG. 10, and then becomes the display as illustrated in FIG. 12. In this example, display of the dialog box 360 starts, for example, after the elapse of one second or more from the start of display of the authentication failed information 380. The fingerprint authentication mode is canceled by way of exception when the dialog box 360 is displayed in the display area 20 even in a case where the operation mode is the lock mode. Thus, the fingerprint authentication does not start when the user touches the power button 3a again in a state illustrated in FIG. 12.

When the short press operation is performed immediately after the start of touching the power button 3a with the finger, the power button 3a is released, and the operation mode is set to the sleep mode in between steps s3 and s4.

Figure 13:
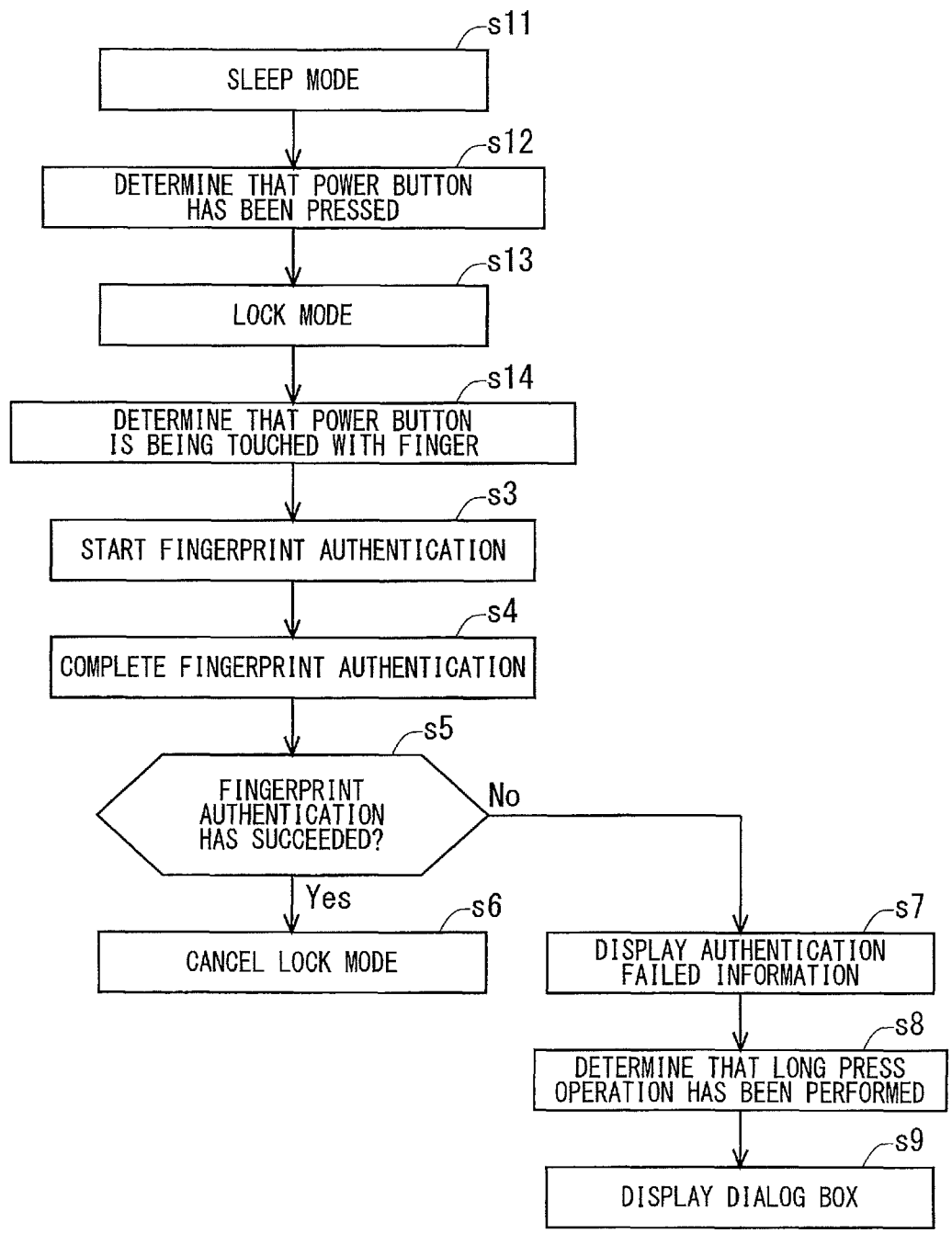
FIG. 13 illustrates a flowchart showing an example of the operation of the electronic apparatus.

The fingerprint authentication is also performed when the long press operation is performed on the power button 3a in a case where the operation mode is the sleep mode. If the fingerprint authentication fails, display of the authentication failed information 380 starts, and then display of the dialog box 360 starts in accordance with the long press operation performed on the power button 3a. FIG. 13 is a flowchart showing an example of the operation of the electronic apparatus 1 when the long press operation is performed on the power button 3a in a case where the operation mode is the sleep mode.

As shown in FIG. 13, when the controller 100 determines that the power button 3a has been pressed, in other words, when the controller 100 determines that the power button 3a has been turned on in a case where the operation mode is the sleep mode (step s11) in step s12, the operation mode is set to the lock mode in step s13. The lock screen 350 is thus displayed in the display area 20. The fingerprint sensor 140 starts operating, and the operation mode is also set to the fingerprint authentication mode.

After step s13, when the controller 100 determines that the power button 3a is being touched with the finger based on the output signal from the fingerprint sensor 140 in step s14, the controller 100 starts the fingerprint authentication by performing step s3 described above. The electronic apparatus 1 thereafter operates in a similar manner.

When the short press operation is performed on the power button 3a in a case where the operation mode is the sleep mode, the power button 3a is released, and the operation mode is set to the sleep mode before step s4.

As described above, the electronic apparatus 1 performs the fingerprint authentication when the long press operation is performed on the power button 3a. If the fingerprint authentication fails, display of the authentication failed information 380 starts (see FIG. 10), and then display of the dialog box 360 starts in accordance with the long press operation performed on the power button 3a (see FIG. 12).

In many cases, the user causes the electronic apparatus 1 to cancel the lock mode by touching the power button 3a to the extent that the power button 3a is not turned on. The user, however, can perform the long press operation on the power button 3a with intent to cause the electronic apparatus 1 to cancel the lock mode. If the fingerprint authentication fails in this case, both the authentication failed information 380 and the dialog box 360 are displayed. In this case, if the dialog box 360 is displayed prior to the authentication failed information 380, the user can be unaware of failure of the fingerprint authentication required to cancel the lock mode. The user can also be unaware of failure of the fingerprint authentication if display of the dialog box 360 and display of the authentication failed information 380 start at the same time.

In this example, display of the authentication failed information 380 starts prior to the start of display of the dialog box 360, and thus the user can check the authentication failed information 380 prior to the dialog box 360. This makes the user more likely to be aware of failure of the fingerprint authentication. As a result, the convenience of the electronic apparatus 1 improves.

Figure 14:
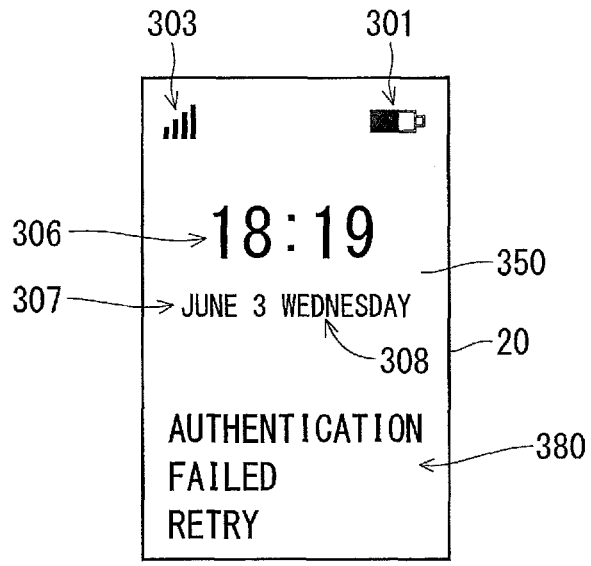
FIG. 14 illustrates an example of the display of the electronic apparatus.

The authentication failed information 380 may be displayed to be more conspicuous at the start of display of the authentication failed information 380 than at the start of display of the dialog box 360 after the start of display of the authentication failed information 380. For example, the authentication failed information 380 may be displayed to have a larger size at the start of display of the authentication failed information 380 than at the start of display of the dialog box 360 after the start of display of the authentication failed information 380, as illustrated in FIG. 14. This makes the user much more likely to be aware of failure of the fingerprint authentication.

The threshold for long press determination is not limited to the above-mentioned example. When the threshold for long press determination is set to be small, step s8 may be performed before step s7 in FIGS. 11 and 13 described above. In this case, step s9 is not performed immediately after step s8 but performed, for example, after the elapse of approximately one second from step s7.

The threshold for long press determination used when the operation mode is set to the fingerprint authentication mode may be set to be greater than the threshold for long press determination used when the operation mode is not set to the fingerprint authentication mode. In other words, the threshold for long press determination used when the fingerprint authentication is performed upon the long press operation performed on the power button 3a may be set to be greater than the threshold for long press determination used when the fingerprint authentication is not performed upon the long press operation performed on the power button 3a.

The state of the controller 100 performing the fingerprint authentication when the long press operation is performed on the power button 3a, and causing, if the fingerprint authentication fails, the display 220 to start displaying notification information (the authentication failed information 380) indicating that the fingerprint authentication has failed, and then causing the display 220 to start displaying information (the dialog box 360) in accordance with the long press operation may herein be referred to as a "first state". The controller 100 is in the first state when the operation mode is set to the fingerprint authentication mode. The state of the controller 100 causing, when the long press operation is performed on the power button 3a, the display 220 to display the information (the dialog box 360) in accordance with the long press operation without performing the fingerprint authentication may be referred to as a "second state". The controller 100 is in the second state when the operation mode is not set to the fingerprint authentication mode.

It can be said that the threshold for long press determination used when the operation mode is set to the fingerprint authentication mode is the threshold for long press determination used when the controller 100 is in the first state. It can also be said that the threshold for long press determination used when the operation mode is not set to the fingerprint authentication mode is the threshold for long press determination used when the controller 100 is in the second state. The threshold for long press determination used in the first state is set, for example, to two to three seconds. The threshold for long press determination used in the second state is set, for example, to 0.5 seconds.

As described above, setting the threshold for long press determination used in the first state to be greater than the threshold for long press determination used in the second state eliminates the need for the user to long press the power button 3a to cause the electronic apparatus 1 to display the dialog box 360 when the controller 100 is in the second state (when the operation mode is not set to the fingerprint authentication mode). The operability of the electronic apparatus 1 thus improves. For example, the user can cause the electronic apparatus 1 to display the dialog box 360 without pressing the power button 3a for a long period of time when the home screen 300 is displayed in the display area 20.

The controller may perform the fingerprint authentication when the press operation is performed on the operation button 3 other than the power button 3a, and may cause, if the fingerprint authentication fails, the display 220 to display the authentication failed information 380 and the information in accordance with the press operation.

For example, in contrast to the above-mentioned example, a case where the operation button 3b is the authentication button, and a list of unread received e-mails is displayed in the display area 20 when the long press operation is performed on the operation button 3b is considered. In such a case, the electronic apparatus 1 operates in a similar manner to that shown in FIG. 11 described above when the long press operation is performed on the operation button 3*b* in a case where the operation mode is the lock mode. In step s2, however, the controller 100 determines that the operation button 3*b* is being touched with the finger based on the output signal from the fingerprint sensor 140. In step s9, the controller 100 causes the display 220 to display the list of unread received e-mails. The electronic apparatus 1 operates in a similar manner to that shown in FIG. 13 described above when the long press operation is performed on the operation button 3*b* in a case where the operation mode is the sleep mode. The controller 100, however, determines that the operation button 3*b* has been pressed in step s12, and determines that the operation button 3*b* is being touched with the finger in step s14. In step s9, the controller 100 causes the display 220 to display the list of unread received e-mails.

In such an example, display of the authentication failed information 380 starts, and then display of the information in accordance with the long press operation performed on the operation button 3*b*, namely, display of the list of unread received e-mails starts.

The user can thus check the authentication failed information 380 prior to the list of unread received e-mails. This makes the user more likely to be aware of failure of the fingerprint authentication.

<Various Modifications>

Various modifications of the electronic apparatus 1 will be described below.

<First Modification>

Figure 15:
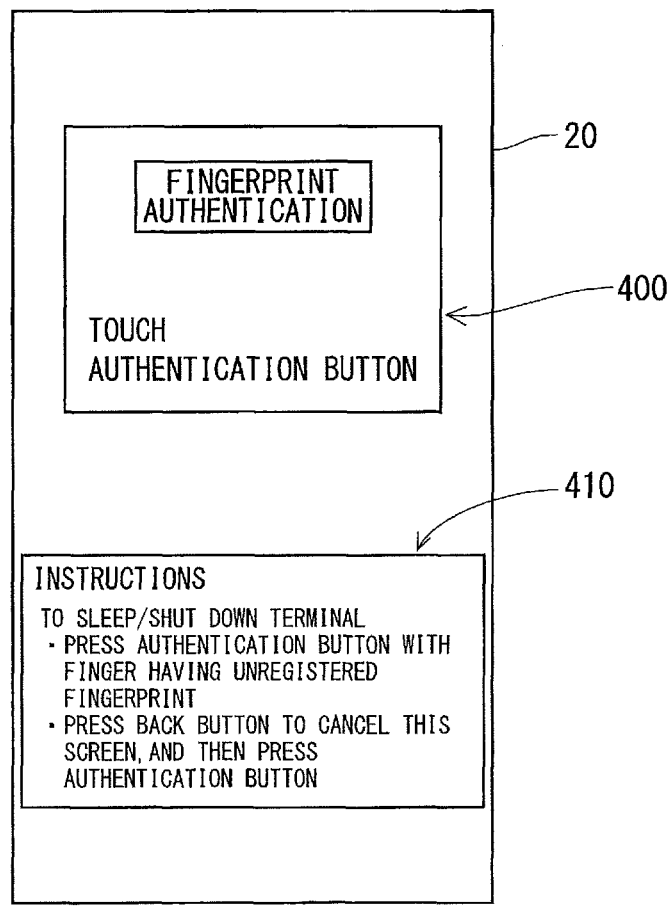
FIG. 15 illustrates an example of the display of the electronic apparatus.

In some cases, the electronic apparatus 1 downloads content, such as an application and music data, either for a fee or for free using a website from a server. In such cases, the electronic apparatus 1 sometimes perform the fingerprint authentication and, if the fingerprint authentication succeeds, can download the content. FIG. 15 illustrates a display example in the display area 20 immediately before the electronic apparatus 1 downloads the content. FIG. 15 is an enlarged view of the display area 20.

The electronic apparatus 1 accesses, using the wireless communication unit 110, a web server providing a website designated by the user. The electronic apparatus 1 receives the website provided by the accessed web server, and displays the website in the display area 20. The user then performs various operations on the display area 20 to designate, for the electronic apparatus 1, the content (e.g., an application) to be downloaded. The electronic apparatus 1 notifies a server storing various types of content that the electronic apparatus 1 downloads the content designated by the user. The operation mode is then set to the fingerprint authentication mode, and the display in the display area 20 transitions, for example, to the display illustrated in FIG. 15.

As illustrated in FIG. 15, an authentication screen 400 and an instruction screen 410 are displayed in the display area 20 to overlap a web page (not illustrated). The authentication screen 400 is a screen notifying the user that the fingerprint authentication is required to download the content. The instruction screen 410 is a screen providing instructions when the user performs the press operation on the power button 3*a* to cause the electronic apparatus 1 to set the operation mode to the sleep mode or the shutdown mode.

After the authentication screen 400 and the instruction screen 410 are displayed in the display area 20, the controller 100 starts the fingerprint authentication when determining that the power button 3*a* is being touched with the finger. If the fingerprint authentication succeeds, the electronic apparatus 1 downloads the content designated by the user from the predetermined server, and stores the content in the storage 103. On the other hand, if the fingerprint authentication fails, the controller 100 causes the display 220 to display the authentication failed information 380.

In some cases, the user wants to cause the electronic apparatus 1 to stop downloading the content and to cause the electronic apparatus 1 to set the operation mode to the sleep mode in the state of the authentication screen 400 being displayed, in other words, in the state of the operation mode being set to the fingerprint authentication mode. In such cases, the operation mode is set to the sleep mode before completion of the fingerprint authentication when the user performs the short press operation immediately after starting touching the power button 3*a*, but the fingerprint authentication can be completed before setting the operation mode to the sleep mode when the user does not perform the short press operation immediately after starting touching the power button 3*a* (when the power button 3*a* is being touched for a while not to be turned on). As a result, the electronic apparatus 1 can download the content without the user's intent. In some cases, the user wants to cause the electronic apparatus 1 to stop downloading the content and to cause the electronic apparatus 1 to set the operation mode to the shutdown mode. In such cases, when the user performs the long press operation on the power button 3*a*, the fingerprint authentication is completed before the dialog box 360 for shutdown is displayed in the display area 20, and the fingerprint authentication mode is canceled as described above. As a result, the electronic apparatus 1 can download the content without the user's intent.

In the present modification, not only the authentication screen 400 but also the instruction screen 410 is displayed in the display area 20 to reduce the possibility of downloading the content without the user's intent. The instruction screen 410 indicates instructions not to download the content without the user's intent when the user causes the electronic apparatus 1 to set the operation mode to the sleep mode or the shutdown mode. In other words, the instruction screen 410 indicates instructions not to succeed in the fingerprint authentication when the user causes the electronic apparatus 1 to set the operation mode to the sleep mode or the shutdown mode.

In an example of FIG. 15, the instruction screen 410 indicates that, to cause the electronic apparatus 1 to set the operation mode to the sleep mode or the shutdown mode, the user is required to perform the press operation on the power button 3*a* with a finger different from the finger having the fingerprint registered in the electronic apparatus 1 in the above-mentioned fingerprint registration mode. The fingerprint authentication fails when the power button 3*a* is touched with the finger different from the finger having the fingerprint registered in the electronic apparatus 1, and thus the possibility of downloading the content without the user's intent can be reduced. The instruction screen 410 further indicates that, to cause the electronic apparatus 1 to set the operation mode to the sleep mode or the shutdown mode, the user is required to perform the press operation on the back button 3*c* to return the display in the display area 20 to the immediately preceding display, and then perform the press operation on the power button 3*a*. When the back button 3*c* is pressed to return the display in the display area 20 to the immediately preceding display, display of the authentication screen 400 is removed and the fingerprint authentication mode is canceled, and thus the fingerprint authentication is not performed when the power button 3*a* is touched. The possibility of downloading the content without the user's intent can thus be reduced. As a result, the convenience of the electronic apparatus 1 improves.

In some cases, the user wants to cause the electronic apparatus 1 to stop downloading the content and to cause the electronic apparatus 1 to display the home screen 300 during display of the authentication screen 400. In such cases, when the home button 3d is the authentication button, the content can be downloaded without the user's intent by the user touching the home button 3d. The possibility of downloading the content without the user's intent can be reduced by displaying the instruction screen 410 also in such cases.

The instruction screen 410 may be displayed each time the electronic apparatus 1 downloads the content, or only when the electronic apparatus 1 downloads the content for the first time after shipment of the electronic apparatus 1. Alternatively, the instruction screen 410 may be displayed for each of websites only when the content is downloaded for the first time using the website.

A selection screen for allowing the user to select whether to cause the electronic apparatus 1 to display the instruction screen 410 in the future may be displayed along with the instruction screen 410. In this case, the user can designate, for the electronic apparatus 1, whether to cause the electronic apparatus 1 to display the instruction screen 410 in the future by performing a predetermined operation on the selection screen.

<Second Modification>

In the present modification, the electronic apparatus 1 displays a confirmation screen 500 for confirming the user's intent without performing the fingerprint authentication when the power button 3a is touched during display of the authentication screen 400 to reduce the possibility of downloading the content without the user's intent. The present modification will be described below.

The electronic apparatus 1 accesses, using the wireless communication unit 110, the web server providing the website designated by the user as described above. The electronic apparatus 1 receives the web page provided by the accessed web server, and displays the web page in the display area 20. The user then performs various operations on the display area 20 to designate, for the electronic apparatus 1, the content (e.g., an application) to be downloaded. The electronic apparatus 1 notifies the server storing various types of content that the electronic apparatus 1 downloads the content designated by the user. The electronic apparatus 1 then causes the display 220 to display the authentication screen 400 as illustrated in an upper portion of FIG. 16. In this case, the operation mode is not set to the fingerprint authentication mode. The operation mode is set to a finger operation determination mode in which the controller 100 repeatedly determines whether the power button 3a is being touched with the finger.

When the power button 3a is touched with the finger during display of the authentication screen 400 in the display area 20, the controller 100 determines that the power button 3a is being touched with the finger. The controller 100 causes the display 220 to display the confirmation screen 500 as illustrated in a lower portion of FIG. 16, for example, in place of the authentication screen 400. In this case, the fingerprint authentication is not performed as the operation mode is not set to the fingerprint authentication mode.

The confirmation screen 500 is a screen for confirming the user's intent as to whether to perform the fingerprint authentication, to set the operation mode to the sleep mode, or to display the dialog box 360 for shutdown. The confirmation screen 500 includes, for example, buttons 501 to 503.

The button 501 is a button for causing the electronic apparatus 1 to perform the fingerprint authentication. The button 502 is a button for causing the electronic apparatus 1 to set the operation mode to the sleep mode. The button 503 is a button for causing the electronic apparatus 1 to display the dialog box 360.

When the electronic apparatus 1 receives, during display of the confirmation screen 500, an input of a sleep performance instruction that is an instruction to perform processing of setting the operation mode to the sleep mode, the electronic apparatus 1 sets the operation mode to the sleep mode. In the present modification, a predetermined operation performed on the confirmation screen 500 is the sleep performance instruction. Specifically, a predetermined operation (e.g., a tap operation) performed on the button 502 is the sleep performance instruction. Thus, when the user performs the tap operation on the button 502, the operation mode is set to the sleep mode.

As described above, the controller 100 herein controls a predetermined component of the electronic apparatus 1 to set the operation mode to the sleep mode. Thus, it can be said that the sleep performance instruction is an instruction for the controller 100 to perform processing to set the operation mode to the sleep mode. Processing performed by the controller 100 to set the operation mode to the sleep mode may hereinafter also be referred to as "sleep corresponding processing". The sleep performance instruction may also be referred to as a "sleep corresponding processing performance instruction".

When the electronic apparatus 1 receives, during display of the confirmation screen 500, an input of a dialog display performance instruction that is an instruction to display the dialog box 360, the electronic apparatus 1 displays the dialog box 360. In the present modification, a predetermined operation performed on the confirmation screen 500 is the dialog display performance instruction. Specifically, a predetermined operation (e.g., a tap operation) performed on the button 503 is the dialog display performance instruction. Thus, when the user performs the tap operation on the button 503, the dialog box 360 is displayed in the display area 20.

When the electronic apparatus 1 receives, during display of the confirmation screen 500, an input of an authentication performance instruction that is an instruction to perform the fingerprint authentication, the electronic apparatus 1 performs the fingerprint authentication. In the present modification, touching the power button 3a with the finger after performance of a predetermined operation on the confirmation screen 500 is the authentication performance instruction. Specifically, touching the power button 3a with the finger after performance of a predetermined operation (e.g., a tap operation) on the button 501 is the authentication performance instruction. Thus, when the user touches the power button 3a with the finger after performing the tap operation on the button 501, the fingerprint authentication is performed.

If the controller 100 has succeeded in the fingerprint authentication, the electronic apparatus 1 downloads the content designated by the user from the predetermined server, and stores the content in the storage 103. On the other hand, if the fingerprint authentication has failed, the controller 100 causes the display 220 to display the authentication failed information 380.

As described above, in the present modification, the controller 100 has a state of causing, when the power button 3a is touched with the finger, the display 220 to display the confirmation screen 500 without performing the fingerprint authentication, and then performing the fingerprint authentication when the electronic apparatus 1 has received the authentication performance instruction, performing the sleep corresponding processing when the electronic apparatus 1 has received the sleep corresponding processing performance instruction, and displaying the dialog box 360 when the electronic apparatus 1 has received the dialog display performance instruction.

Figure 17:
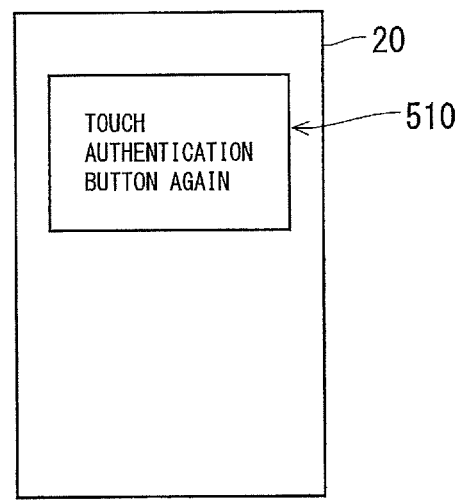
FIG. 17 illustrates an example of the display of the electronic apparatus.

The controller 100 may cause the display 220 to display, for example, a notification screen 510 illustrated in FIG. 17 when the user performs, for example, the tap operation on the button 501. The notification screen 510 is a screen notifying the user that the user is required to touch the power button 3*a* again.

When the short press operation is performed on the power button 3*a* during display of the authentication screen 400 (as illustrated in the upper portion of FIG. 16), the operation mode is set to the sleep mode after or before display of the confirmation screen 500. When the long press operation is performed on the power button 3*a* in a similar state, the dialog box 360 for shutdown is displayed after display of the confirmation screen 500.

When the short press operation is performed on the power button 3*a* during display of the confirmation screen 500 (as illustrated in the lower portion of FIG. 16), the operation mode is set to the sleep mode. This means that the short press operation performed on the power button 3*a* is also the sleep performance instruction. When the long press operation is performed on the power button 3*a* in a similar state, the dialog box 360 is displayed. This means that the long press operation performed on the power button 3*a* is also the dialog display performance instruction.

As described above, in the present modification, when the power button 3*a* is touched with the finger during display of the authentication screen 400, the confirmation screen 500 is displayed without performing the fingerprint authentication. The fingerprint authentication is performed when the electronic apparatus 1 has received the authentication performance instruction. Thus, even when the user unconsciously touches the power button 3*a*, or the user touches the power button 3*a* for the purpose other than the purpose of downloading the content during display of the authentication screen 400, the possibility of downloading the content without the user's intent can be reduced. The convenience of the electronic apparatus 1 thus improves.

Figure 18:
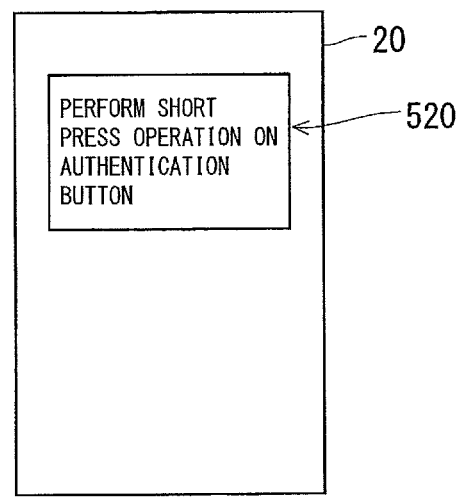
FIG. 18 illustrates an example of the display of the electronic apparatus.

A notification screen 520 illustrated in FIG. 18 may be displayed when a predetermined operation is performed on the button 502. The notification screen 520 is a screen indicating that the short press operation is required to be performed on the power button 3*a*. In this case, the operation mode is set to the sleep mode when the short press operation is performed on the power button 3*a* after display of the notification screen 520. In this example, the short press operation performed on the power button 3*a* after performance of the predetermined operation on the button 502 is the sleep performance instruction.

A notification screen 530 illustrated in FIG. 19 may be displayed when a predetermined operation is performed on the button 503. The notification screen 530 is a screen indicating that the long press operation is required to be performed on the power button 3*a*. In this case, the dialog box 360 is displayed when the long press operation is performed on the power button 3*a* after display of the notification screen 530. In this example, the long press operation performed on the power button 3*a* after performance of the predetermined operation on the button 503 is the dialog display performance instruction.

The confirmation screen 500 may be displayed each time the electronic apparatus 1 downloads the content, or only when the electronic apparatus 1 downloads the content for the first time after shipment of the electronic apparatus 1. Alternatively, the confirmation screen 500 may be displayed for each of websites only when the content is downloaded for the first time using the website. When the confirmation screen 500 is not displayed in downloading the content, the operation mode is set to the fingerprint authentication mode during display of the authentication screen 400 as in the first modification.

A selection screen for allowing the user to select whether to cause the electronic apparatus 1 to display the confirmation screen 500 in the future may be displayed along with the confirmation screen 500. In this case, the user can designate, for the electronic apparatus 1, whether to cause the electronic apparatus 1 to display the confirmation screen 500 in the future by performing a predetermined operation on the selection screen.

<Third Modification>

In a case where the operation mode is set to the fingerprint authentication mode during display of the authentication screen 400 as in the above-mentioned first modification, the fingerprint authentication can be performed, and the content can be downloaded without the user's intent if the power button 3*a* is being touched with the finger when the electronic apparatus 1 has changed to the state of displaying the authentication screen 400.

In the present modification, the controller 100 performs the fingerprint authentication when the power button 3*a* is touched with the finger during display of the authentication screen 400. This means that the controller 100 performs the fingerprint authentication when the controller 100 determines that the state of the power button 3*a* not being touched with the finger has changed to the state of the power button 3*a* being touched with the finger during display of the authentication screen 400. The controller 100 does not perform the fingerprint authentication if the power button 3*a* is being touched with the finger when the state has changed to the state of displaying the authentication screen 400. This means that the controller 100 does not perform the fingerprint authentication if the power button 3*a* is being touched with the finger when the controller 100 has changed to the state of performing the fingerprint authentication when the power button 3*a* is touched with the finger. The present modification will be described below by taking a specific example.

FIG. 20 is a diagram for explaining the operation of the electronic apparatus 1 according to the present modification. For example, a case where the short press operation is performed on the power button 3*a* during display of the authentication screen 400 to set the operation mode to the sleep mode is considered. When the short press operation is performed on the power button 3*a* in this case, the operation mode is set to the lock mode, and the lock screen 350 is displayed (as illustrated in an upper portion of FIG. 20). The fingerprint authentication is performed when the power button 3*a* is touched with the finger during display of the lock screen 350. If the fingerprint authentication succeeds, the electronic apparatus 1 changes from the state of displaying the lock screen 350 to the state of displaying the authentication screen 400 (as illustrated in a lower portion of FIG. 20).

The controller 100 does not perform the fingerprint authentication if the power button 3*a* is being touched with the finger when the state of displaying the lock screen 350 has changed to the state of displaying the authentication screen 400. The controller 100 performs the fingerprint authentication when the power button 3*a* is touched with the finger after display of the authentication screen 400. This can reduce the possibility of downloading the content without the user's intent if the power button 3a is continuously being touched with the finger after the electronic apparatus 1 is caused to cancel the lock mode. The convenience of the electronic apparatus 1 thus improves. In a case where the user is touching the power button 3a with the finger when the authentication screen 400 is displayed, the user can cause the electronic apparatus 1 to perform the fingerprint authentication by once releasing the finger from the power button 3a after display of the authentication screen 400, and then touching the power button 3a again with the finger.

The controller 100 also does not perform the fingerprint authentication if the power button 3a is being touched with the finger when the state of displaying a screen other than the lock screen 350 has changed to the state of displaying the authentication screen 400. For example, in some cases, the press operation is performed on the back button 3c during display of a screen corresponding to an application being executed to display the authentication screen 400. In such cases, the controller 100 does not perform the fingerprint authentication if the power button 3a is being touched with the finger when the state of displaying the screen corresponding to the application has changed to the state of displaying the authentication screen 400.

As described above, in the present modification, the controller 100 does not perform the fingerprint authentication if the power button 3a is being touched with the finger when the controller 100 has changed to the state of performing the fingerprint authentication when the power button 3a is touched with the finger. This can reduce the possibility of performing the fingerprint authentication without the user's intent.

Figure 21:
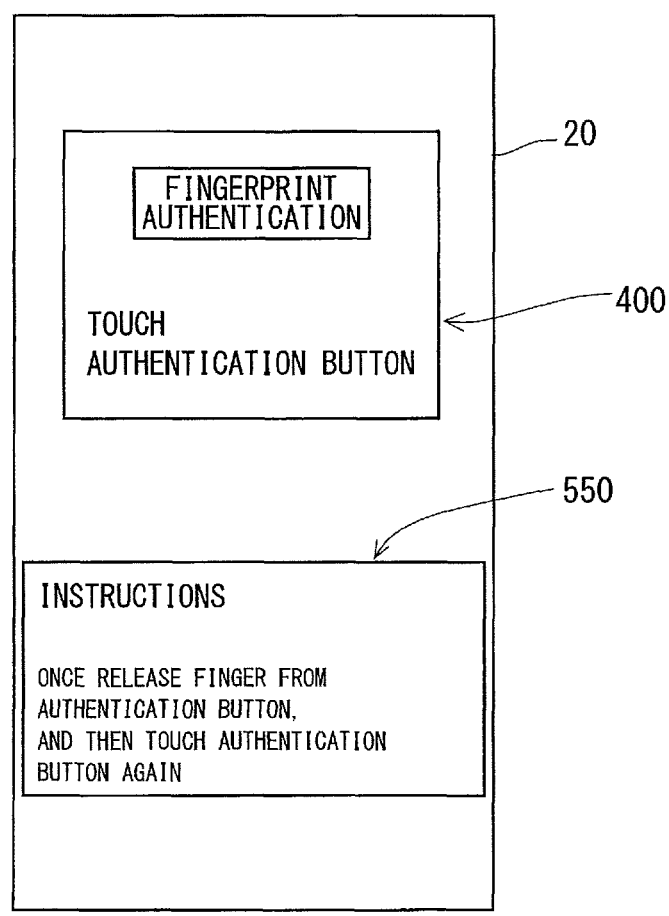
FIG. 21 illustrates an example of the display of the electronic apparatus.

An instruction screen 550 as illustrated in FIG. 21 may be displayed if the power button 3a is being touched with the finger when the state has changed to the state of displaying the authentication screen 400. The instruction screen 550 indicates that, after the finger is once released from the power button 3a, the power button 3a is required to be touched again with the finger to perform the fingerprint authentication. It can be said that the instruction screen 550 is notification information indicating that, after the finger is once released from the power button 3a, the power button 3a is required to be touched again with the finger to perform the fingerprint authentication.

<Other Modifications>

Although the fingerprint authentication performed for the electronic apparatus 1 to download the content is described in the above-mentioned second and third modifications, what is described above is applicable to a case where the fingerprint authentication is used for other purposes.

For example, a case where there is an application to be executed after the fingerprint authentication is considered. In such a case, when the tap operation is performed on one of the application icons 305 for executing the application included in the above-mentioned home screen 300, for example, an application execution authentication screen notifying the user that the fingerprint authentication is required to be performed to execute the application as with the above-mentioned authentication screen 400 is displayed in the display area 20. If the fingerprint authentication succeeds, the controller 100 reads, from the storage 103, the application corresponding to the application icon on which the tap operation has been performed, and executes the application. In such a case, the instruction screen 410 is displayed along with the application execution authentication screen in the second modification. This can reduce the possibility of succeeding in the fingerprint authentication without the user's intent. In the third modification, the fingerprint authentication is not performed if the power button 3a is being touched with the finger when the state of displaying the lock screen 350 has changed to the state of displaying the application execution authentication screen, for example. This can reduce the possibility of performing the fingerprint authentication without the user's intent.

Although the electronic apparatus 1 is a mobile phone, such as a smartphone, in the above-mentioned examples, the electronic apparatus 1 may be other types of electronic apparatuses. The electronic apparatus 1 may be a tablet terminal, a personal computer, and a wearable apparatus, for example. The wearable apparatus used as the electronic apparatus 1 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus.

While the electronic apparatus 1 has been described above in detail, the above description is in all aspects illustrative and not restrictive. Various modifications described above are applicable in combination unless any contradiction occurs. It is understood that numerous modifications not having been described can be devised without departing from the scope of the present disclosure.

What is claimed is:

1. An electronic apparatus comprising:
   a display;
   a hardware button;
   a fingerprint sensor configured to detect a fingerprint of a finger touching the hardware button; and
   at least one processor configured to perform fingerprint authentication based on a fingerprint detection result obtained by the fingerprint sensor, wherein
   the at least one processor has an authentication performance state of performing the fingerprint authentication when the hardware button is touched with the finger, and
   the at least one processor does not perform the fingerprint authentication if the hardware button is being touched with the finger during a time when the at least one processor is changing from a non-authentication performance state to the authentication performance state, and performs fingerprint authentication only after changing to the authentication performance state is completed if the hardware button is once again touched with the finger, wherein in the non-authentication performance state no fingerprint authentication is performed and a first screen is displayed on the display and in the authentication performance state an authentication screen is displayed on the display, the authentication screen being different from the first screen and instructing a user to touch the hardware button, and
   wherein when the at least one processor has changed to the authentication performance state, the at least one processor causes the display to display notification information indicating that, after the finger is released from the hardware button, the hardware button is required to be touched again with the finger to perform the fingerprint authentication.

2. A control device included in an electronic apparatus to control operation of the electronic apparatus, the electronic apparatus including a hardware button and a fingerprint sensor configured to detect a fingerprint of a finger touching the hardware button, the control device comprising:

a display;

at least one processor configured to perform fingerprint authentication based on a fingerprint detection result obtained by the fingerprint sensor, wherein the at least one processor has an authentication performance state of performing the fingerprint authentication when the hardware button is touched with the finger, and the at least one processor does not perform the fingerprint authentication if the hardware button is being touched with the finger during a time when the at least one processor is changing from a non-authentication performance state to the authentication performance state, and performs fingerprint authentication only after changing to the authentication performance state is completed if the hardware button is once again touched with the finger, wherein in the non-authentication performance state no fingerprint authentication is performed, and a first screen is displayed on the display and in the authentication performance state an authentication screen is displayed on the display, the authentication screen being different from the first screen and instructing a user to touch the hardware button, and wherein when the at least one processor has changed to the authentication performance state, the at least one processor causes the display to display notification information indicating that, after the finger is released from the hardware button, the hardware button is required to be touched again with the finger to perform the fingerprint authentication.

3. A non-transitory computer readable recording medium that stores a control program for controlling an electronic apparatus including a hardware button and a fingerprint sensor configured to detect a fingerprint of a finger touching the hardware button, wherein the control program causes the electronic apparatus not to perform fingerprint authentication if the hardware button is being touched with the finger during a time when the at least one processor is changing from a non-authentication performance state to the authentication performance state, and performs fingerprint authentication only after changing to the authentication performance state is completed if the hardware button is once again touched with the finger, wherein in the non-authentication performance state no fingerprint authentication is performed and a first screen is displayed on the display, and in the authentication performance state an authentication screen is displayed on the display, the authentication screen being different from the first screen and instructing a user to touch the hardware button, and wherein when the at least one processor has changed to the authentication performance state, the at least one processor causes the display to display notification information indicating that, after the finger is released from the hardware button, the hardware button is required to be touched again with the finger to perform the fingerprint authentication.

* * * * *